US 9,313,534 B2

(12) United States Patent
Bauer et al.

(10) Patent No.: US 9,313,534 B2
(45) Date of Patent: Apr. 12, 2016

(54) EFFICIENT AUTHORIZATION SYSTEM FOR MULTI-CHANNEL BROADCAST PROGRAM OPTIONS

(75) Inventors: William D. Bauer, Gering, NE (US); David W. Eder, Bozeman, MT (US)

(73) Assignee: Intertech Corp., Gering, NE (US)

( * ) Notice: Subject to any disclaimer, the term of this patent is extended or adjusted under 35 U.S.C. 154(b) by 0 days.

(21) Appl. No.: 13/992,220

(22) PCT Filed: Dec. 7, 2010

(86) PCT No.: PCT/US2010/059306
§ 371 (c)(1),
(2), (4) Date: Jun. 6, 2013

(87) PCT Pub. No.: WO2012/078143
PCT Pub. Date: Jun. 14, 2012

(65) Prior Publication Data
US 2013/0268958 A1    Oct. 10, 2013

(51) Int. Cl.
*H04N 7/167* (2011.01)
*H04N 21/258* (2011.01)
(Continued)

(52) U.S. Cl.
CPC ... *H04N 21/25816* (2013.01); *H04N 21/26606* (2013.01); *H04N 21/63345* (2013.01)

(58) Field of Classification Search
CPC .......... H04N 21/4622; H04N 21/4627; H04N 21/482; H04N 21/266; H04N 21/26606; H04N 21/6334; H04N 21/14; H04N 21/2665
USPC ........................................................ 725/48
See application file for complete search history.

(56) References Cited

U.S. PATENT DOCUMENTS 5,734,853 A * 3/1998 Hendricks et al. ............ 715/716
5,937,067 A * 8/1999 Thatcher et al. .............. 380/212
(Continued)

FOREIGN PATENT DOCUMENTS

WO    2012078143 A1    6/2012

OTHER PUBLICATIONS

International Application No. PCT/US2010/059306, Filed Dec. 7, 2010, International Search Report dated Feb. 27, 2011.
(Continued)

*Primary Examiner* — Pankaj Kumar
*Assistant Examiner* — Timothy Newlin
(74) *Attorney, Agent, or Firm* — Santangelo Law Office, P.C.

(57) ABSTRACT

A rapid authorization system (22) for subscriber programming authorization with high levels of security can include entitlement management messages (23) that direct fluctuation of an existing package with a communication structure that may involve a primary service directive indicator (3) that is altered, transformed, or fluctuated by a secondary service directive indicator (4) or more. Terse, high entropy directives and entitlement management messages can be transmitted and a multi-channel broadcast programming fluctuation processor (9) at a multi¬ channel broadcast receiver (8) can act to achieve the proper authorization. A conditional access system can be provided through existing, even one-way or SSL, communication pathways with high levels of security. Large subscriber base a la carte options can be provided with rapid authorization that may include nonce programming collective storage (26) for use with a fluctuation entitlement management message transmission.

26 Claims, 3 Drawing Sheets

(51) Int. Cl.
*H04N 21/266* (2011.01)
*H04N 21/6334* (2011.01)

(56) References Cited

U.S. PATENT DOCUMENTS

| | | | |
|---|---|---|---|
| 6,005,938 | A | 12/1999 | Banker et al. |
| 6,105,134 | A * | 8/2000 | Pinder .................... H04L 63/04 |
| | | | 348/E5.004 |
| 6,157,719 | A | 12/2000 | Wasilewski et al. |
| 6,539,548 | B1 * | 3/2003 | Hendricks et al. ............ 725/109 |
| 6,580,720 | B1 * | 6/2003 | Francis et al. ................ 370/423 |
| 7,072,472 | B2 | 7/2006 | Kubota et al. |
| 7,143,294 | B1 | 11/2006 | Johnson |
| 7,155,611 | B2 * | 12/2006 | Wajs et al. .................... 713/182 |
| 7,257,227 | B2 | 8/2007 | Chen et al. |
| 7,383,438 | B2 | 6/2008 | Fahrny et al. |
| 7,454,618 | B2 * | 11/2008 | Dauvois et al. ............... 713/171 |
| 7,508,942 | B2 | 3/2009 | Candelore |
| 7,509,430 | B2 * | 3/2009 | Oota .............................. 709/229 |
| 7,519,999 | B2 | 4/2009 | Sedacca |
| 7,548,624 | B2 | 6/2009 | Kahn et al. |
| 7,552,343 | B2 | 6/2009 | Desmitch et al. |
| 7,558,759 | B2 | 7/2009 | Valenzuela et al. |
| 7,571,451 | B2 * | 8/2009 | Bertram ......................... 725/31 |
| 7,590,243 | B2 | 9/2009 | Kahn et al. |
| 7,634,665 | B2 | 12/2009 | Johnson |
| 8,375,410 | B2 * | 2/2013 | Lee et al. ........................ 725/50 |
| 2001/0054112 | A1 * | 12/2001 | Nobakht et al. ............... 709/245 |
| 2003/0115602 | A1 * | 6/2003 | Knee et al. ....................... 725/42 |
| 2004/0117817 | A1 * | 6/2004 | Kwon et al. ...................... 725/31 |
| 2004/0120529 | A1 * | 6/2004 | Zhang et al. .................... 380/278 |
| 2004/0215691 | A1 * | 10/2004 | Maria Van De Ven et al. ......... 709/200 |
| 2004/0242150 | A1 * | 12/2004 | Wright et al. ................. 455/3.02 |
| 2004/0257470 | A1 * | 12/2004 | Leyendecker ......... H04N 7/163 |
| | | | 348/552 |
| 2005/0197962 | A1 * | 9/2005 | Critchfield et al. ............. 705/53 |
| 2005/0216942 | A1 * | 9/2005 | Barton ............................ 725/97 |
| 2007/0083895 | A1 * | 4/2007 | McCarthy et al. ............... 725/46 |
| 2007/0220551 | A1 * | 9/2007 | Shanks et al. ................... 725/43 |
| 2007/0244982 | A1 * | 10/2007 | Scott et al. ..................... 709/217 |
| 2008/0016424 | A1 * | 1/2008 | Chen ............................. 714/752 |
| 2008/0022298 | A1 * | 1/2008 | Cavicchia ....................... 725/25 |
| 2008/0235725 | A1 * | 9/2008 | Hendricks ....................... 725/35 |
| 2010/0162321 | A1 * | 6/2010 | Bradley .......................... 725/56 |
| 2010/0192180 | A1 * | 7/2010 | Olague et al. ................... 725/42 |
| 2010/0242062 | A1 * | 9/2010 | Reynolds et al. ............... 725/25 |
| 2010/0262988 | A1 * | 10/2010 | Bauer et al. ..................... 725/26 |
| 2011/0202962 | A1 * | 8/2011 | Kanda ............................ 725/48 |

OTHER PUBLICATIONS

International Application No. PCT/US2010/059306, Filed Dec. 7, 2010, Written Opinion of the International Searching Authority dated Feb. 27, 2011.

* cited by examiner

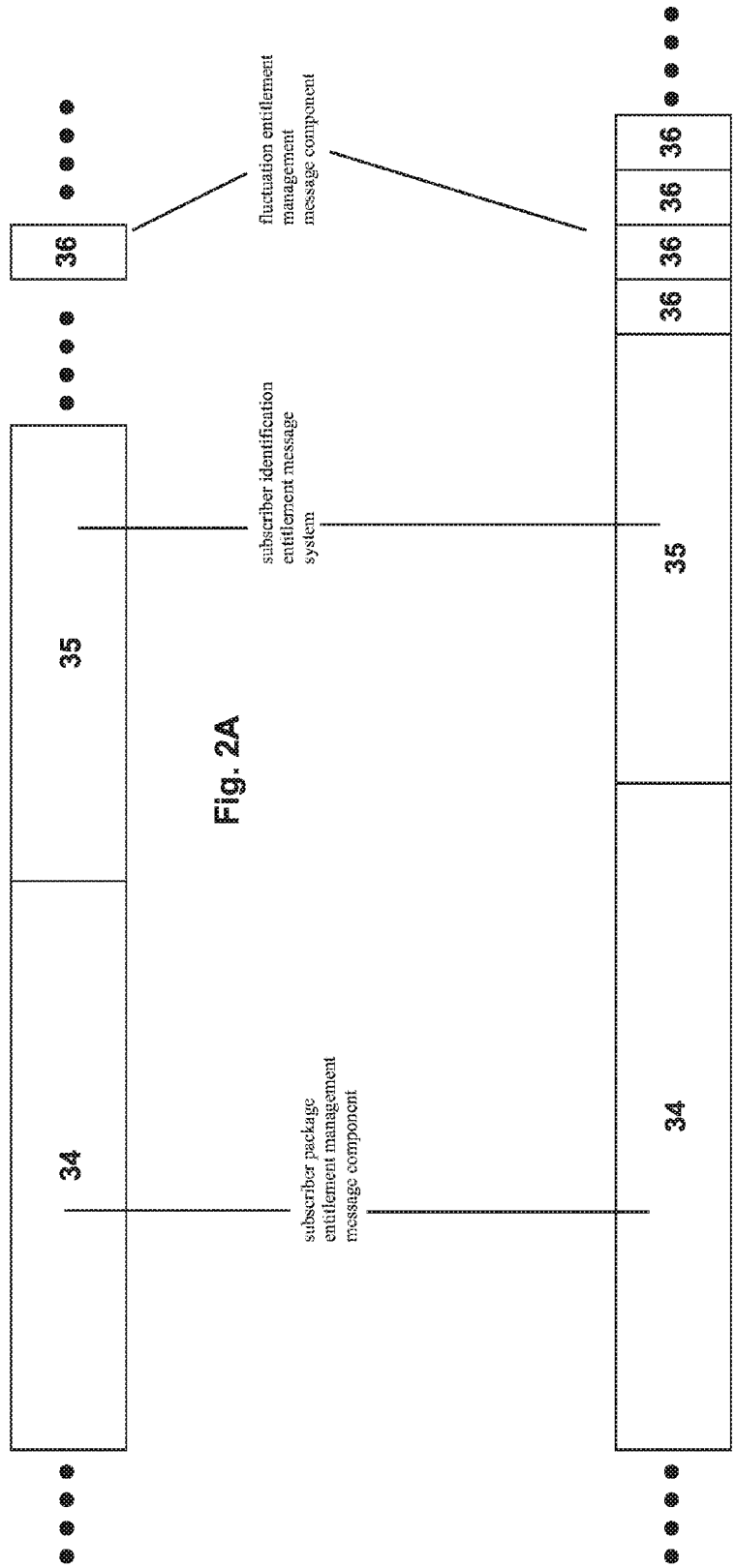

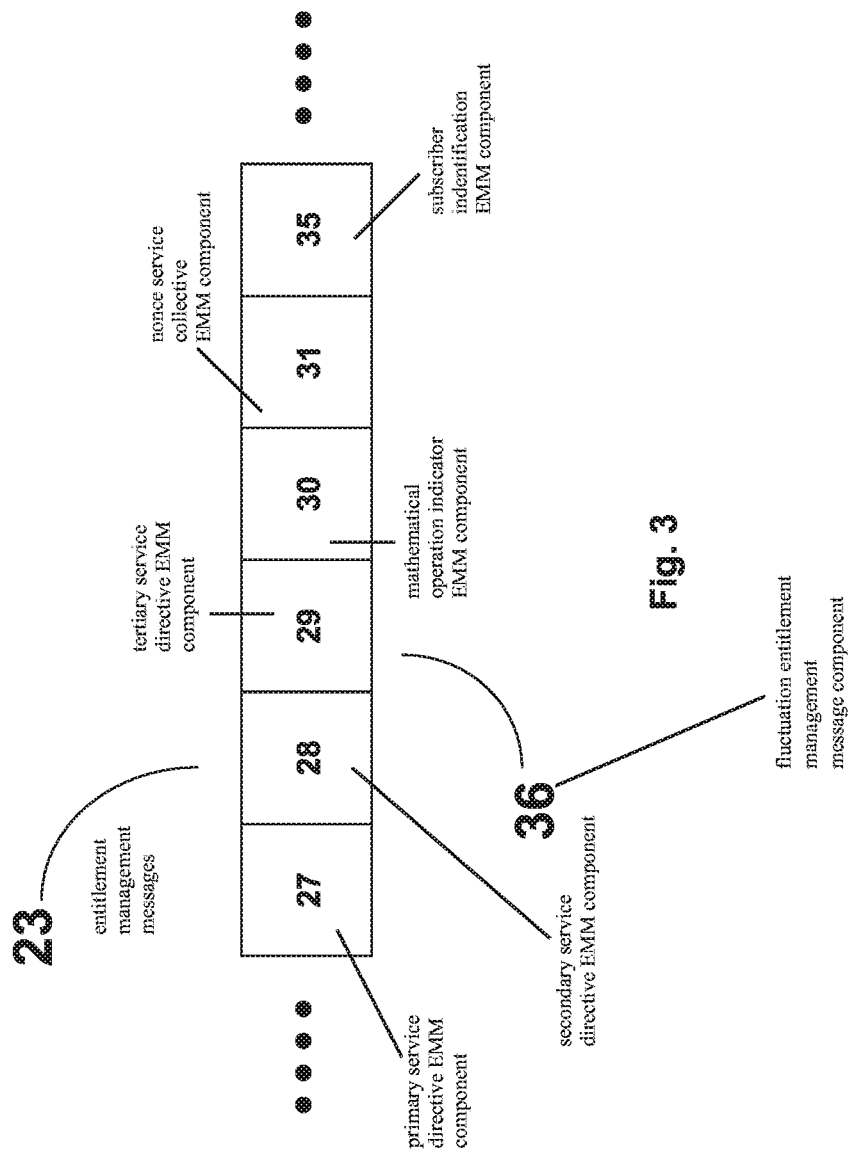

EFFICIENT AUTHORIZATION SYSTEM FOR MULTI-CHANNEL BROADCAST PROGRAM OPTIONS

This application is the United States National Stage of international PCT application number PCT/US2010/059306, filed Dec. 7, 2010, said application is hereby incorporated by reference herein.

TECHNICAL FIELD

This invention relates initially to subscriber based programming systems such as cable television systems that provide secure, subscriber access to a collection of programming signals. More specifically, it involves systems that include set top or other individualized receivers which require repetitive and often system wide authorization in order to present and even unlock each customer's selected programming signals. The invention is particularly suited to use with cable or satellite television or other broadcast providers that may desire to offer highly individualized and even á la carte programming options and that may permit customers to readily and perhaps transiently change or even add individual programming options in addition or in lieu of their base subscription package.

BACKGROUND

Cable and satellite television and radio systems are examples of programming based applications where subscriber access is desired. Typically, the subscriber access is provided through use of encrypted signals and some type of decoder. For cable-television and other systems, it is not uncommon to have a receiver and a decoder such as a set-top box from which a television or other device may display or present the information received. Such systems frequently utilize an entitlement management message (EMM) or other such communication to authorize the decoder's presentation of paid-for programming. This is often presented as part of a package that the subscriber selects. In addition, individualized programming such as pay-per-view and the like is often made available for a premium. In some instances, it is not uncommon for the subscriber to select an individual program such as a movie, game, event, or the like for a one-time presentation.

In addition, subscriber based systems often utilize complex encryption processes to maintain the security of their system and the integrity of their programming. Frequently an entire subscriber base is reauthorized to assure security. This can happen at set time(s) such as on the hour or the like and can involve hundreds of thousands or millions of authorizations. Because a subscriber base can involve such numbers of subscribers, it can be appreciated that the amount of time for total reauthorization can be important. Authorization or re-authorization can depend upon not only the number of subscribers involved, but also the types of packages selected and even the programming demographic. If subscribers have selected similar packages, authorization can be grouped together and so the amount of similarity is also a factor in the total authorization time. For this reason it has become commonplace to permit subscribers to only select certain possibilities from a limited number of packages. While this limit has not been desirable, it has been accepted as a necessary incident of high levels of reauthorization and security with fast authorization. Thus, although there has been a long felt desire to facilitate more programming options and even á la carte programming, there has not been an understanding that permitted development of the technical systems to practically achieve this. To some extent these perceptions have existed because in spite of the often extreme precautions taken to protect encryption, the cable industry has more than 25 years of experience with sophisticated attacks on its security systems. Compromised authorization remains an important consideration, and attacks such as cloning, musketeering, replaying messages, substituting message language, insider compromises, and vulnerability of trusted hardware still remain to name but a few. For some time, there has existed a goal of being able to provide á la carte programming options to a large number of or entire system of subscribers with secure broadcast signals. The present invention makes the accepted practice unnecessary while still maintaining fast total authorization times. It permits practical inclusion of even á la carte programming for a large number of subscribers while allowing rapid authorization or reauthorization consistent with high levels of security.

SUMMARY DISCLOSURE OF THE INVENTION

The present invention provides technology, methods, and apparatus that can achieve a fast cable television or other subscriber programming authorization with high levels of security and large subscriber options. The invention provides various approaches that provide a new approach to authorizing programming that in some embodiments provide for entitlement management messages that direct fluctuation to transform an existing package with a new communication structure. This structure can involve a primary service directive that is altered or fluctuated by a secondary service directive. These perhaps sometimes terse directives can be transmitted and a fluctuation processor at a receiver can then act to transform the service directive to achieve the proper authorization. Other embodiments can provide a conditional access system through existing communication pathways with high levels of security. Such communication pathways can even include one-way communication pathways in order to download an alterable or even initially provided conditional access system. From an overall perspective, embodiments can provide a secure, high option, large subscriber base á la carte system. As mentioned, entitlement management messages can be provided and these individual management messages can be structured in a fashion where they provide unusually high entropy information for rapid authorization. It is perhaps even surprising that the present invention provides systems that show that security and rapid authorization for a large subscriber base, high options system need not be mutually exclusive. Through various embodiments, the present invention shows that various processes and hardware devices can be provided to achieve rapid authorization while providing the option of near or complete á la carte programming options in a practical manner. Naturally, further objects of the inventive technology are apparent from the description and drawings below.

BRIEF DESCRIPTION OF THE DRAWINGS

FIGS. 2A and B conceptually depict some entitlement management message structures that may be used in embodiments of the present invention.

FIG. 3 conceptually depicts one type of fluctuation entitlement management message structure for some embodiments of the present invention.

MODE(S) FOR CARRYING OUT THE INVENTION

Figure 1:
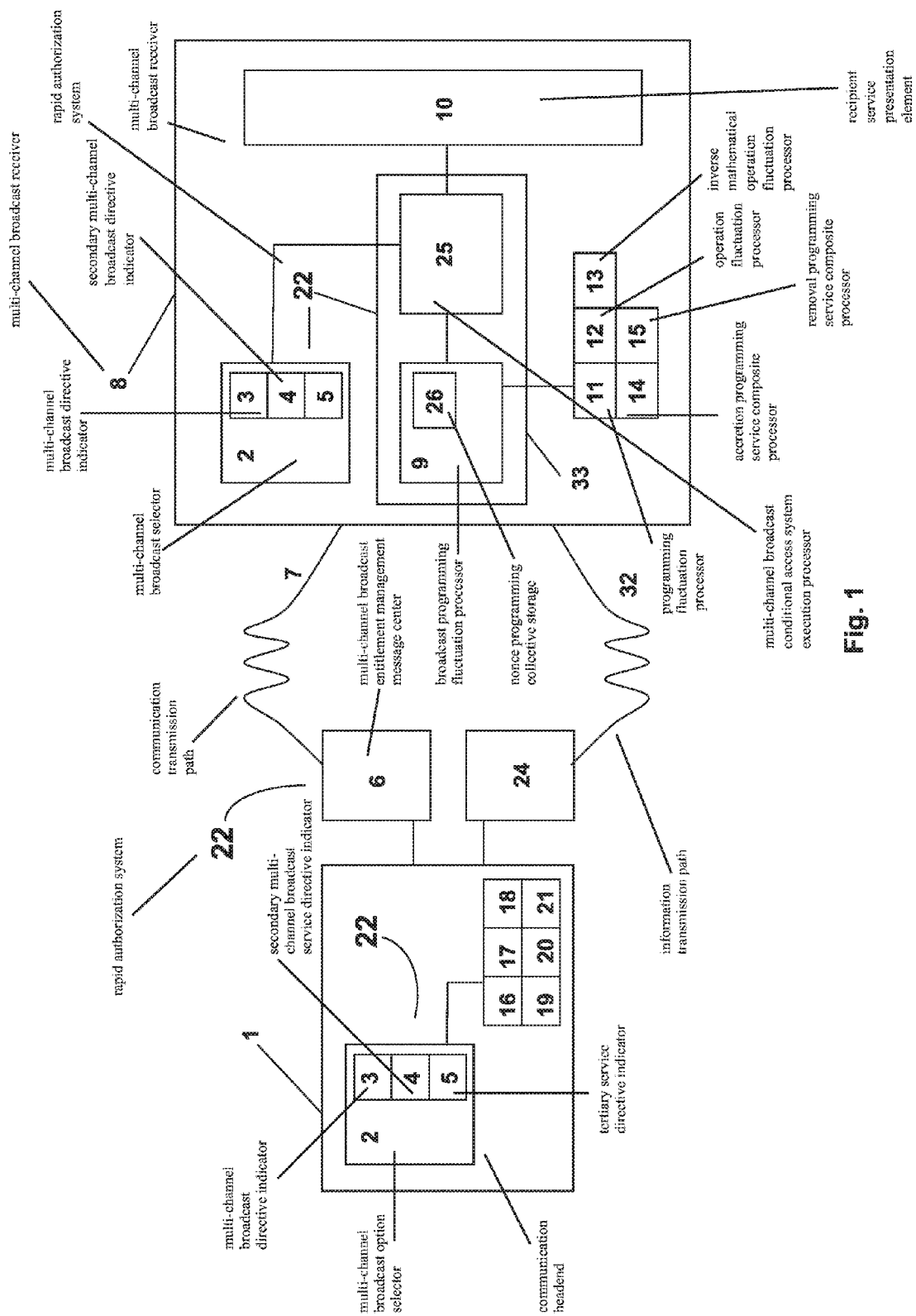
FIG. 1 is a schematic diagram of a cable television type of system according to one embodiment.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

FIG. 1 presents a schematic diagram of an embodiment of the invention. It provides a context to step through various method steps and hardware elements involved, and to understand how systems according to the present invention can provide each of the methods set out. At a general level, the invention can be understood as involving a communication headend (1) that provides and can cause the transmission of programming to a multi-channel broadcast receiver (8). The communication headend (1) can include a multi-channel broadcast program option selector (2) that can allow subscriber selection at some level. This multi-channel broadcast program option selector (2) can be provided at the communication headend (1) and perhaps some functionality also at a multi-channel broadcast receiver (8) or on the internet or the like. In this fashion, the subscriber can make a selection and the selection can be embodied within the hardware at the communication headend (1) and also at the multi-channel broadcast receiver (8).

As can be understood, there can be established a multi-channel broadcast service transmission capability as well as a service receipt capability. These can involve the hardware indicated as the communication headend (1) and the multi-channel broadcast receiver (8). These two can be connected by a communication or recipient communication transmission path (7). As discussed later, there may also be specialized or other communication paths such as a conditional access system information transmission path (32). The indication of the transmission path (7) may be responsive to the communication headend (1) in that it may achieve communication or include data that is caused by or originates from or as a result of the communication headend (1). A particular type of communication that is used in embodiments of the present invention is an entitlement management message. As shown in the figures, the overall system can use a multi-channel broadcast entitlement management message transmitter (6). This may serve to cause a transformation of the communication and even data in the communication relative to authorization of desired program. As a result of this and other communications, the multi-channel broadcast receiver (8) may be responsive to the communication transmission path in that aspects may transform the communication so it can receive programming on that path or authorize programming as a result of an entitlement management message or the like from that path.

The multi-channel broadcast receiver (8) may also include a multi-channel broadcast receiver processor (33). This multi-channel broadcast receiver processor (33) may include one or more processing capabilities that may achieve either authorization of a subscribed programming selection, operation of a conditional access system, ultimate presentation of programming, or other functions as may be well understood. Embodiments may also include a multi-channel broadcast conditional access system execution processor (25) that may be enacted or executed, even within the multi-channel broadcast receiver (8). This multi-channel broadcast conditional access system may be transmitted on the communication transmission path (7) or the conditional access system information transmission path (32) to be initially provided to the multi-channel broadcast receiver (8), to be updated in the multi-channel broadcast receiver (8), or to be operated.

The present invention also provides embodiments that modify the multi-channel system to provide a multi-subscriber program option system and to provide methods of providing numerous subscriber multi-channel broadcast program options through which rapid authorization is possible. Embodiments of the invention may provide a rapid authorization system (22) that can be used to authorize a highly variable recipient programming selection across a large subscriber base. This can be accomplished by a total authorization time that is substantially less than the traditional time for such a subscriber base with this level of highly variable recipient programming selection.

As mentioned earlier, rapid authorization can be accomplished even with secure authorization and so the system can provide a rapid secure authorization system where fast authorization can be achieved in a secure manner. In keeping with these goals, hardware of the invention can present a multi-channel broadcast program option selector (2) as a highly variable recipient programming option selector. This can be accomplished at the communication headend (1) in combination with other capabilities such as at, or through use of, the multi-channel broadcast receiver (8). One of the ways that rapid authorization can be accomplished can be through configuring the multi-channel broadcast entitlement management message transmitter (6) to be a high entropy multi-channel broadcast entitlement management message transmitter. This can be accomplished through programming, software, computer or microprocessor implementation, and hardware, perhaps at the communication headend (1) that creates and transforms the entitlement management message to provide a high entropy message. As a high entropy message the message may contain an unusually high amount of information for its content size. Significant can be the fact that the secure high entropy multi-channel broadcast entitlement management message transmitter can be responsive to a highly variable recipient programming option selector. This means that not only can subscribers be provided highly variable programming options, the hardware or system may provide a high entropy, entitlement management message that may allow significantly variable authorizations while yet also including unusually terse communications. Through this type of a general system, the multi-channel broadcast service receipt capability such as that within the multi-channel broadcast receiver (8) can authorize highly variable programming.

Referring again to FIG. 1, it can be understood one embodiment of the invention can achieve authorization by providing a high entropy entitlement management message. As depicted, it can be understood that the multi-channel broadcast program option selector (2) may include a primary multi-channel broadcast service directive indicator (3), a secondary multi-channel broadcast service directive indicator (4), and possibly even a tertiary service directive indicator (5) or more.

Referring for simplicity to a system that includes only the primary multi-channel broadcast service directive indicator (3) and the secondary multi-channel broadcast service directive indicator (4), it can be understood that the communication headend (1) may cause some type of the indication perhaps through an electronic message of a primary multi-channel broadcast service directive. This primary multi-channel broadcast service directive may be an indication of a particular base package from which ultimate authorization may be derived. As shown in one type of entitlement management message structure shown conceptually in FIG. 3, it can be seen that this primary multi-channel broadcast service directive may be embodied in a particular portion of an electronic entitlement management message, namely, that portion depicted conceptually as a primary multi-channel broadcast service directive entitlement management message component (27) which a communication headend (1) may generate or cause to be provided.

A secondary multi-channel broadcast service directive can also be issued. Again, this secondary multi-channel broadcast service directive indicator may be a portion of the electronic communications such from the secondary multi-channel broadcast service directive indicator which can cause issuance of an entitlement management message component (28) as depicted in FIG. 3. The secondary multi-channel broadcast service directive may be a communication that provides information sufficient to allow some sort of change or delta variation on a base package such as that indicated by the primary multi-channel broadcast service directive. With these two types of information, it can be understood that the multi-channel broadcast receiver processor (33) may act to utilize these two communications in a manner where the primary multi-channel broadcast service directive is actually fluctuated, transformed, or changed in some degree according to information contained in the secondary multi-channel broadcast service directive. Thus, as a result of the communication headend (1) or other capability indicating these two or other types of service directives, the multi-channel broadcast receiver (8) may accomplish fluctuating one package by a particular amount in order to transform, create, and achieve an ultimate multi-channel broadcast service composite. This multi-channel broadcast service composite can then be used for total authorization of the particular subscriber having the multi-channel broadcast receiver (8) at their locale.

Through embodiments, the invention may include a multi-channel broadcast program option selector (2) that provides for at least primary and secondary multi-channel broadcast service directive indicators (3) and (4), it can be seen that the multi-channel broadcast entitlement management message transmitter (6) may actually be configured to function as a fluctuation entitlement management message transmitter. This can be accomplished by a particular transmitter actually transforming a communication and issuing an entitlement management message that is configured to serve as a fluctuation entitlement management message such as by directing a fluctuation in the management message component (36) depicted in FIG. 3. As may be appreciated from the above discussion, this process can be one wherein a primary multi-channel service directive is fluctuated by or according to a secondary multi-channel broadcast service directive in order to create the multi-channel broadcast service composite.

A variety of types of operations are also possible in order to achieve the fluctuation that results in the multi-channel broadcast service composite. These operations may be controlled by a multi-channel broadcast programming fluctuation processor (9) as may be contained perhaps within the multi-channel broadcast receiver (8). This multi-channel broadcast programming fluctuation processor (9) may be a separate, dedicated or even internal part of an overall multi-channel broadcast receiver processor (33). In operation, the multi-channel broadcast programming fluctuation processor (9) may be configured or perhaps even programmed to execute functions, according to the entitlement management message communicated to it such as by executing program functions at the receipt capability. This may occur within the multi-channel broadcast receiver (8). These program functions may accomplish a variety of operations, including but not limited to simple mathematical operations. These mathematical operations my perhaps be such as accreting to or removing from an existing base package that may be embodied by using the conceptual mathematical operations of addition and subtraction. It is also possible that the fluctuation entitlement management message may indicate the type of operation desired (e.g., addition or subtraction), as well as the particular operand for that operation in order for the broadcast programming fluctuation processor (9) to be responsive to such indicators. Of course these may be generated by, be caused by, or may emanate as a result of the communication headend (1).

An aspect that may be included in embodiments of the invention may be that of providing security at any or all of the levels. One example may be that of providing security at the multi-channel broadcast entitlement management message transmitter (6). The multi-channel broadcast entitlement management message transmitter (6) may be configured as a secure transmitter in that it may provide a secure communication or secure information. Similarly, the authorization transformation or process that may occur such as within multi-channel broadcast receiver (8) can be configured to transform electronic circuitry within the receiver in response to a particular type of entitlement management message that transforms other circuitry to accomplish securely authorizing through encryption or in a manner that does not lend itself to unwanted discovery. Similarly, the primary and secondary directive indicators may be configured as secure indicators so that neither the primary, nor the secondary, component of communication can be discerned as it is transmitted perhaps over the communication transmission path (7). Naturally, the programming fluctuation processor, as may be contained within or as part of the multi-channel broadcast receiver processor (33), may be a secure processor so that instructions and decryption information or other activities cannot be discerned by third parties. Each of these may be provided through the use of any encryption technologies as is well understood in the art.

An overall purpose of the entire system is to provide a subscriber with selected programming content options. This can be accomplished through a recipient service presentation element (10), such as may be contained within or responsive to the multi-channel broadcast receiver (8). For systems where a fluctuation process is accomplished, the recipient service presentation element (10) may be responsive to multi-channel broadcast programming fluctuation processor (9) whether that responsiveness is direct or indirect such as that which occurs through intervening elements or otherwise where one item means a change in another even if attenuated. Once authorized, the recipient service presentation element (10), such as is contained within the multi-channel broadcast receiver (8) may ultimately facilitate or achieve presenting the authorized service to a recipient or subscriber as an authorized multi-channel broadcast service.

In achieving the fluctuation processes discussed above, both fundamental and more complex operatives can be achieved by the multi-channel broadcast programming fluctuation processor (9). These operatives or operations can include programming to allow the multi-channel programming fluctuation processor (9) to be configured in a variety of ways. These may include as a fundamental operative multi-channel broadcast programming fluctuation processor (11) perhaps that only provides fundamental mathematical operatives such as addition and subtraction. The processor may also be configured as a multiple mathematical operation fluctuation processor (12) so that differing or even multiple steps can be achieved or directed to result in the ultimate service composite. In keeping with the goal of providing terse communications and rapid authorization, the multi-channel broadcast programming fluctuation processor (9) may be configured as an inverse mathematical operation fluctuation processor (13) whereby the processor may by a single or efficient communication achieve an operation or its inverse, such as subtraction being the inverse of addition. The addition and subtraction functions may be provided such as through an accretion programming service composite processor (14), and a removal programming service composite processor (15), respectively.

As may be appreciated, through appropriate programming, systems can be configured to associate specific operation types with particular communication. For example, a secondary multi-channel broadcast service directive indicator (4) may be automatically associated with one specific operation, perhaps such as addition or the like, to permit an even more succinct communication and faster authorization. In this manner the system may accomplish the methods of embodiments of the invention by accreting individual programming options or channels or group programming options without a need to indicate which operation since only one is implied to create the accretion programming service composite.

The steps of accreting and removing may be accomplished with respect to group program options such as when one package or collection of programming channels may be removed from another package or other collection of programming channels. In this manner it can be understood how the secondary multi-channel broadcast service directive may function as the operand of a particular mathematical operation to achieve the desired fluctuation and create the ultimate programming service composite. Thus, certain operation types can be automatically associated with particular service directives such as where the secondary service directive is an operand for an implied mathematical operation for more efficient communication. Naturally, the secondary service directive may also include information relative to the type of operation that is desired as well. This type of embodiment might be one that includes a mathematical operation indicator entitlement management message component (30) as shown in FIG. 3.

Referring to FIGS. 1 and 3, it can be seen that not only a primary multi-channel broadcast service directive indicator and a secondary multi-channel broadcast service directive indicator may be included, but also there may also be a third, tertiary or even further additional service directive indicators. For example, a tertiary service directive indicator (5) may act to create a tertiary service directive indicator entitlement management message component (29) in the communication as shown in FIG. 3. This portion of the communication may provide an additional opportunity to allow a more complex or perhaps just additional desired indication in order to achieve the ultimate service composite. Additional service directives may be provided and these may be set to work with more efficient EMM communication and authorization times. For efficiency there may be about 4, 5, 7, or 8 service directives and service directive indicators if desired.

These service directives and indicators may also be secure. As may be appreciated in FIG. 1, each of these indicators and indeed, the overall multi-channel broadcast program option selector (2) may exist to all or just some extent within the multi-channel broadcast receiver (8). It may exist to allow subscriber selection such as through operation of the multi-channel broadcast receiver (8), through operation of a separate communication pathway, through the Internet, or as a result of capabilities associated with or communicating through action of the communication headband (1). The multi-channel broadcast program option selector (2) may even exist in limited fashion at any location such as in a receiver, perhaps as something to merely decode the appropriate selection communication within the multi-channel broadcast receiver (8). As may be appreciated, the tertiary service directive indicator (5) may act to achieve a service directive in addition to the primary and secondary service directives.

One of the more noteworthy results of systems according to the present invention may be the ability to provide subscribers with substantially á la carte multi-channel broadcast programming options. Unlike current systems where subscribers may be forced into predetermined package selections, embodiments may facilitate practical application of à la carte selection options so that subscribers may be able to pick and choose nearly every channel that they do or do not want. In order to achieve this, systems may be configured so that the multi-channel broadcast program option selector (2) functions as an à la carte multi-channel broadcast program option selector. This may permit subscribers to add or subtract channels nearly individually as desired. In one embodiment, systems may be configured to permit selection of the base package with only individual channel additions. These additions can permit more efficient and entitlement management message communications. For example, it may be possible to economically incent less programming changes while still offering á la carte options. Systems can even effectively incent limited programming changes progressively such as through pricing when additional changes cost more or the like. Some systems may progressively incent no more than 2, 3, or 5 programming changes, or the like.

In establishing substantially à la carte programming options, other systems may be configured to allow for optimized groups. This may be accomplished through pricing or user interface techniques. Other designs may be provided as well. Embodiment can provide individual base packages selected so that accretion or removal is accomplished in a balanced fashion. For example, under one such system, the individual packages may be strategically arranged so that the vast majority of subscribers will be essentially adding or removing only a couple individual channels to achieve their desired à la carte result. This may even be accomplished in the background and unknown to the subscriber so that the subscriber merely picks independent individual channels desired, and the system internally determines the optimal or perhaps least cost base package plus channel additions, and perhaps channel removals, to accomplish the desired service composite. Type of system configuration can provide optimization from the perspective of authorization times and high entropy entitlement management messages. It may also provide optimization to provide a fluctuation optimized primary package multi-channel broadcast program option selector. Such a package can even change over time with a shifting programming demographic or season. As mentioned later with respect to entitlement management message structures optimized selections (by the subscriber or internally) may aid in providing an efficient authorization system in general.

Numerous structures can facilitate systems that provide fluctuation optimized selections or even primary packages or primary service directives. Primary packages may be configured so that shorter communication times, smaller transmission data size, smaller overall EMM size, or perhaps just less change or differing occurrences exist for a more rapid total subscriber authorization or reauthorization. Systems may even be configured to optimize EMM size and authorization times with consideration of the program demographic for an overall subscriber population such as for systems that may take into account the likelihood of an individual sporting event's popularity in a program demographic of subscribers. Thus, systems may include a transmission data size optimized multi-channel broadcast program option selector and may provide for a transmission data size practicality optimized package option, a fluctuation optimized primary package multi-channel broadcast program option selector, a transmission data size optimized primary service directive, a transmission data size optimized secondary service directive, an overall subscriber transmission optimized multi-channel broadcast program option selector, and may establish at least one overall subscriber transmission optimized package option, an entitlement management message optimized multi-channel broadcast program option selector, and may provide for establishing at least one entitlement management message optimized package option, a program demographic fluctuation optimized multi-channel broadcast program option selector, and may provide for establishing at least one program demographic optimized package option, among other options.

One way in which internal calculations can be made is that of utilizing a close package and creating the ultimate service composite off of that close package. This can be done individually or for the overall subscriber base. Whether a subscriber first selects a package and then makes changes to it or simply selects a service composite package in an à la carte fashion, systems can determine a close package so that more efficient communication of any necessary fluctuation can exist. Thus, the primary multi-channel broadcast service directive may indicate that closest package with the secondary multi-channel broadcast service directive merely indicating an addition of individual channels or the like. Naturally both additions and removals are possible and may be accomplished as a functional operation on a close package determinant. It is also possible to provide nearly à la carte high variation programming options such as might be available, where only some channels are provided in conjunction with other channels or the like. In this and other fashions, the system can be configured to provide a substantially à la carte high variation multi-channel broadcast program option selector to recipients. In systems where only individual channel additions are possible, it is also possible to select the closest lower package, either internally or through subscriber interface. Naturally internal calculations to determine the closest package, a close package, or even the closest lower package may be accomplished at the communication headend (1), within multi-channel broadcast receiver (8), or in some associated computing or processing capability.

Similar to the aspect of offering à la carte programming options is that of offering far greater programming options (albeit less than true à la carte options) across a large number of recipients. This may even be accomplished to substantially all recipients such as by ubiquitously offering a large communication capacity of programming options to recipients. This large number of programming options can include a number simply greater than existing traditional capability such as greater than about 10, 15, 20, 30, 50, and even perhaps 100 different alternative programming options, and similarly having a programming option selector with like numbers of selections. Each of these numbers may represent a large communication capacity of programming options.

Another goal of the invention is to achieve rapid authorization or reauthorization. This can be accomplished by providing a rapid authorization system (22) that may act to rapidly authorize not just an individual selection but a highly variable recipient programming selection across a large subscriber base. The rapid authorization in an abridged total authorization time that is substantially less than the traditional authorization time for such a subscriber base with such variable programming selections. The rate at which authorization is achieved may be a rate faster than at least about 8000, 10000, 15000, or even 20,000 customers per second. These rates can be for a substantially à la carte list of options such as 100, 200 or more channels over a large subscriber base that may include greater than about 250000, 500000, or even 1 million total subscribers. All this may of course be accomplished securely following embodiments of the present invention. A rapid authorization system (22) may operate at rates greater than about 15, 10, 7, or even as little as about 5 seconds per thousand customers. This of course can be calculated on the average across a large subscriber base as differing customer desires may lead to differing authorization times on an individual level. Such rates may be possible even with secure à la carte programming options. In general systems according to the present invention may provide for high variation program options that are greater than traditional program variation options such as the current system permit where perhaps only 3 or 4 packages are made available with further additions likely viewed as pay-per-view purchases.

Focusing on the entitlement management message structures possible, two different types of structures are shown in FIGS. 2 and 3. FIG. 2 conceptually depicts two message transmission structures that may be used in embodiments of the present invention. FIG. 3 conceptually depicts one type of fluctuation entitlement management message internal information structure for an embodiment of the present invention. From FIG. 2A, it can be seen that an element management message may include a subscriber package entitlement management message component (34), a subscriber identification entitlement management message component (35), and perhaps a fluctuation entitlement management message component (36). This fluctuation entitlement management message component (36) may be provided as a separate communication, as conceptually shown in FIG. 2A, or as an integral part of an overall singular communication, as shown in FIG. 2B. As shown in FIG. 2B there may be multiple fluctuation entitlement management message components (36) such as one for each different type of à la carte subscriber or even one for each individual user (although this may be less than optimal from an overall subscriber authorization time perspective). Subscriber groupings can be accomplished by type of à la carte subscriber such as by grouping those subscribers who have perhaps selected the same à la carte combinations for an ending service composite. As may be appreciated from FIGS. 2A and 2B, one or each portion of the message, or indeed one or each communication itself, may authorize a number of subscribers for a particular package. Then a separate portion of or separate communication may be provided to more efficiently authorize a fluctuation portion for that individual subscribers service composite. Such separate authorizations are within the scope of steps and devices that accomplish a perceived or stated service composite authorization. Again, as shown in FIG. 2B this may be accomplished in one overall communication or through different components of a message.

Referring to the fluctuation entitlement management message component (36), it can be understood how this component may include conceptually different (even if not identifiably distinct) individual information items or components. As shown conceptually in FIG. 3, the fluctuation entitlement management message component (36) may be the entire entitlement management message (23). Importantly, however, whether as part of its own communication or as merely a component to a much larger communication, the fluctuation entitlement management message component (36) may conceptually include a primary service directive EMM component (27), a secondary service directive EMM component (28), and perhaps even a tertiary service directive EMM component (29). Each of these may be generated or provided through the primary, secondary, and tertiary service directive indicators (3), (4), and (5). In addition, as discussed earlier, if mathematical operations are not implied, it is possible to provide as a conceptually separate component or even as part of an existing component a mathematical operation indicator EMM component (30). Further, as discussed later there may be a nonce service collective indicator EMM component (31). Finally, some type of subscriber identification may be included perhaps such as through a subscriber identification EMM component (35). This subscriber identification EMM component (35) may include one or more subscriber identifications for the particular fluctuation desired. The initial portion of the authorization communication depicted in FIGS. 2A and 2B, the subscriber identification EMM component (35), may include a multitude of like subscribing customers. So, too, in the FIG. 3 depiction it should be understood that the subscriber identification EMM component (35) may also include a number of subscriber identifications. It may also be individual identification component perhaps as may be understood from FIG. 2B, where there are multiple fluctuation EMM components (36), and each of these components may indicate as little as one individual subscriber selection processes (although this is less likely or desired).

As maybe appreciated from the foregoing structures, it can be understood how the invention can include embodiments that have a bandwidth discordant entitlement management message transmitter or even bandwidth discordant entitlement management message. By being bandwidth discordant, the size of the communication may not be as large as or even consistent with traditional understanding relative to the amount of service information provided. For example, by providing a base package and only an individual fluctuation in an entitlement management message as conceptually shown in the component (36) in FIG. 2A, this smaller component can essentially provide a complete à la carte specification in a relatively small amount of communication bandwidth or message size. Thus, the message itself is bandwidth discordant in that it indicates far more information than its size would lead a traditional understanding to believe. Similarly, the message and the transmitter can be configured to provide an information abridged entitlement management message whereby the message itself provides only abridged information, perhaps such, the fluctuation information only or the like. The message or information can also can also be configured to provide an education entitlement management message or a similar education EMM transmitter, whereby the management message elicits or brings out (such as through the nonce system described later) the ultimate service composite but does not itself contain all of the details of that service composite. Under each of these structures embodiments can be arranged to provide less than full programming information entitlement management messages and thus a less than full programming information entitlement management message transmitter. These types of management messages can be considered high entropy management messages because they essentially contain or inform the recipient multi-channel broadcast receiver (8) of sufficient information to generate and authorize a desired service composite without themselves containing all the information of that particular service composite.

As mentioned earlier, and with respect to FIGS. 1 and 3, as there can be both a nonce service collective indicator entitlement management message component (31), and a nonce programming collective storage (26) for storing such information. A nonce programming collective can be used in conjunction with a nonce multi-channel broadcast entitlement management message, which can be a type of message that relies upon the fact that certain basic programming combinations or information may be already stored somewhere, such as within the multi-channel broadcast receiver (8). This nonce service collective indicator entitlement management message component (31) may simply identify which or if a particular nonce package(s) is desired such as part of the primary service directive. A multi-channel broadcast receiver (8) may contain, perhaps within a processor or associated memory, a nonce programming collective storage (26) which can be transformed to include a complete listing of all the channels contained in some base package indication or the like. This nonce collective information can then be used and acted upon by the fluctuation processor (9) to achieve the service composite. The nonce programming collective storage (26) may be provided or appropriately transformed at the time of manufacture of the chipset used within the multi-channel broadcast receiver (8) or maybe separately downloaded and even altered or transformed during operations. A nonce programming collective may even be transiently stored or transformed within some processing capability, whether it be at the communication headend (1) associated capability, or additionally within a separate memory of a multi-channel broadcast receiver processor (33) as may be contained within multi-channel broadcast receiver (8) at the user's premises. In situations where the multi-channel broadcast entitlement management message transmitter (6) transmits information that relies upon the nonce programming collective, the transmitter may act to transform the communication or be configured as a nonce based multi-channel broadcast entitlement management message transmitter. Of course, the nonce entitlement management message and the nonce programming collective can each be provided and maintained securely and so this aspect also lends itself to security elements of the present invention. Of course, numerous possibilities exist for the nonce programming collective and these may include a minimum customer base package, and average customer base package, a number of different alternatives such as 2, 3, 4, or even 8 or more nonce programming collectives. Furthermore, as users desires change, seasonal desires change, and as programming evolves, the nonce programming collective(s) may be altered and there may be a downloadable programming collective. The multi-channel broadcast programming authorization processor may be responsive to the nonce based multi-channel broadcast entitlement management message transmitter to accomplish its electronic transformation.

As mentioned earlier, authorization can be accomplished through a conditional access system. As such, the multi-channel broadcast receiver (8) may include a multi-channel broadcast conditional access system execution processor (25). A conditional access system is often considered a most vulnerable or perhaps important part of the receiver from the perspective of maintaining security. For this reason, it has been traditionally provided in an unusually secure fashion. Many conditional access systems have been provided only at manufacture by inclusion in a secure microchip provided only as hardware. Others have been provided as a downloadable system, but only through a separate communication path whereby particular security appropriate for the importance of a conditional access system is included, such as in a two-way path with a public/private key structure. The present invention provides embodiments that permit practical inclusion of a conditional access system via existing paths (designated as information prior transmission paths) and even via one-way paths. Interestingly, while separate communication paths where previously provided such as a separate conditional access system information transmission path (32) depicted in FIG. 1, the present invention allows use of existing separate and even existing combined communication paths, perhaps such as the communication transmission path (7). With the teachings of certain encryption designs (including those disclosed in PCT patent application WO/2010/098745 hereby incorporated by reference), it is possible to securely provide entirely new or updatable conditional access systems through existing communication paths. The information may transform and be inserted into the independent information transmission path and then executed by the multi-channel broadcast conditional access system execution processor (25) or some other processing capability serving to achieve a transformation of the electronic circuitry within the receiver. Thus, it should be understood that this conditional access system execution processor (25) may be nothing other than programming of an existing otherwise usable processor such as within multi-channel broadcast receiver (8). This separate processor may even be the multi-channel broadcast receiver processor (33) although it is possible to include separate security systems and hardware devices whereby separate processing capabilities may be desired. Once the system is transmitted, the multi-channel broadcast conditional access system execution processor (25) may act to transform circuitry and so establish an operational conditional access system at the multi-channel broadcast service receipt capability. This conditional access system may be used to present authorized programming in a secure fashion through the secure multi-channel broadcast programming authorization processor perhaps within the multi-channel broadcast receiver (8).

By using a transmission path that may be independent of a conditional access system, efficiencies can be had because existing paths may be provided appropriate configurations or information to allow adequate transmission of the desired conditional access system or its update. This existing path may be a secure information transmission path and may even be a secure socket layer protocol transmission path. In embodiments this path may further receive particular encryption protocols and communication structures so that the desired security of the transmission and of the conditional access system can be met to a higher degree. Interestingly, as disclosed in the referenced PCT application, is possible to use, and achieve communication transformations on, a highly secure one-way communication path without any need for two-way encryption communication such as in public/private encryption or symmetrical key encryption in providing this aspect.

As can be easily understood from the foregoing, the basic concepts of the present invention may be embodied in a variety of ways. It involves both authorization techniques as well as devices to accomplish the appropriate authorization. In this application, the authorization techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "processor" should be understood to encompass disclosure of the act of "processing"—whether explicitly discussed or not—and, conversely, were there effectively disclosure of the act of "processing", such a disclosure should be understood to encompass disclosure of a "processor" and even a "means for processing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below are hereby appended and hereby incorporated by reference and may also aid the search effort, however, as to each of the above, to the extent that such information or statements incorporated by reference might be considered inconsistent with the patenting of this/these invention(s) such statements are expressly not to be considered as made by the applicant(s).

U.S. Patents

| Pat. No. | Kind Code | Issue Date | Name of Patentee or Applicant of cited Document |
|---|---|---|---|
| 7,364,665 | B2 | 2009 Dec. 15 | Johnson |
| 7,590,243 | B2 | 2009 Sep. 15 | Kahn et al. |
| 7,571,451 | B2 | 2009 Aug. 04 | Bertram |
| 7,558,759 | B2 | 2009 Jul. 07 | Valenzuela et al. |
| 7,552,343 | B2 | 2009 Jun. 23 | Desmicht et al. |
| 7,548,624 | B2 | 2009 Jun. 16 | Kahn et al. |
| 7,519,999 | B2 | 2009 Apr. 14 | Sedacca |
| 7,509,430 | B2 | 2009 Mar. 24 | Oota |
| 7,508,942 | B2 | 2009 Mar. 24 | Candelore |
| 7,454,618 | B2 | 2008 Nov. 18 | Dauvois et al. |
| 7,383,438 | B2 | 2008 Jun. 03 | Fahrny et al. |
| 7,257,227 | B2 | 2007 Aug. 14 | Chen et al. |
| 7,155,611 | B2 | 2006 Dec. 26 | Wajs et al. |
| 7,143,294 | B1 | 2006 Nov. 28 | Johnson |
| 7,072,472 | B2 | 2006 Jul. 04 | Kubota et al. |
| 6,157,719 | | 2000 Dec. 05 | Wasilewski et al. |
| 6,005,938 | | 1999 Dec. 21 | Banker et al. |

Thus, the applicant(s) should be understood to have support to claim and make a statement of invention to at least: i) each of the authorization systems and devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent or dependent claims or concepts presented, with each dependent claim to be understood as including language "as described in claim xxx or any other claim", and xiv) all inventions described herein.

In addition and as to computer, software, or processing aspects and each aspect amenable to programming or other electronic automation, the applicant(s) should be understood to have support to claim and make a statement of invention to at least: xv) processes performed with the aid of or on a computer as described throughout the above discussion, xvi) a programmable apparatus as described throughout the above discussion, xvii) a computer readable memory encoded with data to direct a computer comprising means or elements which function as described throughout the above discussion, xviii) a computer configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) the related methods disclosed and described, xxvi) similar, equivalent, and even implicit variations of each of these systems and methods, xxvii) those alternative designs which accomplish each of the functions shown as are disclosed and described, xxviii) those alternative designs and methods which accomplish each of the functions shown as are implicit to accomplish that which is disclosed and described, xxix) each feature, component, and step shown as separate and independent inventions, and xxx) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims and clauses set forth at any time are hereby incorporated by reference as part of this description of the invention, and the applicant expressly reserves the right to use all of or a portion of such incorporated content of such claims or clauses as additional description to support any of or all of the claims to be examined or any element or component thereof, and the applicant further expressly reserves the right to move any portion of or all of the incorporated content of such claims or clauses or any element or component thereof from the description into the claims for eventual examination and grant or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

CLAUSES AVAILABLE AS DESCRIBED ABOVE

Potential patent claims supported and available for presentation include:

1. A method of providing numerous subscribers multi-channel broadcast program options comprising the steps of:
   establishing a service transmission capability;
   establishing a service receipt capability;
   indicating a primary multi-channel broadcast service directive;
   indicating a secondary multi-channel broadcast service directive;
   fluctuating said primary multi-channel broadcast service directive by said secondary multi-channel broadcast service directive to create a multi-channel broadcast service composite;
   authorizing service based on said multi-channel broadcast service composite; and
   presenting said service to a recipient.
2. A method of providing numerous subscribers multi-channel broadcast program options as described in claim 1 or any other claim or clause wherein said step of authorizing service based on said multi-channel broadcast service composite comprises the step of securely authorizing service based on said multi-channel broadcast service composite.
3. A method of providing numerous subscribers multi-channel broadcast program options as described in claim 2 or any other claim or clause wherein said step of indicating a primary multi-channel broadcast service directive comprises the step of securely indicating a primary multi-channel broadcast service directive, and wherein said step of indicating a secondary multi-channel broadcast service directive comprises the step of securely indicating a secondary multi-channel broadcast service directive.
4. A method of providing numerous subscribers multi-channel broadcast program options as described in claim 1 or any other claim or clause wherein said step of fluctuating said primary multi-channel broadcast service directive by said secondary multi-channel broadcast service directive to create a multi-channel broadcast service composite comprises the step of operating on said primary service directive by said secondary service directive.
5. A method of providing numerous subscribers multi-channel broadcast program options as described in claim 4 or any other claim or clause wherein said step of operating on said primary service directive by said secondary service directive comprises the step of applying at least one fundamental operative utilizing said primary service directive and said secondary service directive.
6. A method of providing numerous subscribers multi-channel broadcast program options as described in claim 5 or any other claim or clause wherein said step of fluctuating said primary multi-channel broadcast service directive by said secondary multi-channel broadcast service directive to create a multi-channel broadcast service composite comprises the step of utilizing said secondary service directive as an operand for said fundamental operative to fluctuate said primary service directive by said secondary service directive.

7. A method of providing numerous subscribers multi-channel broadcast program options as described in claim 1 or any other claim or clause and further comprising said step of indicating at least one operation type to apply.
8. A method of providing numerous subscribers multi-channel broadcast program options as described in claim 4 or any other claim or clause and further comprising the step of utilizing multiple different operations to create said service composite.
9. A method of providing numerous subscribers multi-channel broadcast program options as described in claim 8 or any other claim or clause wherein said step of utilizing multiple different operations to create said service composite comprises the step of associating specific operation types with specific service directives to create said service composite.
10. A method of providing numerous subscribers multi-channel broadcast program options as described in claim 7 or any other claim or clause wherein said step of indicating at least one operation type to apply comprises the step of making available an operation and the inverse of said operation.
11. A method of providing numerous subscribers multi-channel broadcast program options as described in claim 10 or any other claim or clause wherein said step of making available an operation and the inverse of said operation comprises the step of succinctly indicating said operation or said inverse mathematical operation.
12. A method of providing numerous subscribers multi-channel broadcast program options as described in claim 1 or any other claim or clause wherein said step of fluctuating said primary multi-channel broadcast service directive by said secondary multi-channel broadcast service directive to create a multi-channel broadcast service composite comprises the step of creating an accretion programming service composite.
13. A method of providing numerous subscribers multi-channel broadcast program options as described in claim 12 or any other claim or clause wherein said step of creating an accretion programming service composite comprises the step of accreting individual program options.
14. A method of providing numerous subscribers multi-channel broadcast program options as described in claim 12 or 13 or any other claim or clause wherein said step of accretion creating an accretion programming service composite comprises the step of accreting group program options.
15. A method of providing numerous subscribers multi-channel broadcast program options as described in claim 1 or any other claim or clause wherein said step of fluctuating said primary multi-channel broadcast service directive by said secondary multi-channel broadcast service directive to create a multi-channel broadcast service composite comprises the step of creating a removal programming service composite.
16. A method of providing numerous subscribers multi-channel broadcast program options as described in claim 15 or any other claim or clause wherein said step of creating a removal programming service composite comprises the step of removing individual program options.
17. A method of providing numerous subscribers multi-channel broadcast program options as described in claim 15 or 16 or any other claim or clause wherein said step of creating a removal programming service composite comprises the step of removing group program options.
18. A method of providing numerous subscribers multi-channel broadcast program options as described in claim 1 or any other claim or clause wherein said step of fluctuating said primary multi-channel broadcast service directive by said secondary multi-channel broadcast service directive to create a multi-channel broadcast service composite comprises the steps of:
creating an accretion programming service composite; and
creating a removal programming service composite.
19. A method of providing numerous subscribers multi-channel broadcast program options as described in claim 1 or any other claim or clause and further comprising said step of indicating at least one tertiary service directive, and wherein said step of fluctuating said primary multi-channel broadcast service directive by said secondary multi-channel broadcast service directive to create a multi-channel broadcast service composite comprises the step of fluctuating said primary service directive by said tertiary service directive in addition to said secondary service directive.
20. A method of providing numerous subscribers multi-channel broadcast program options as described in claim 1 or any other claim or clause and further comprising said step of establishing a multitude of fluctuation optimized package options.
21. A method of providing numerous subscribers multi-channel broadcast program options as described in claim 3 or any other claim or clause wherein said step of securely indicating a primary multi-channel broadcast service directive primary comprises the step of indicating at least one fluctuation optimized package option.
22. A method of providing numerous subscribers multi-channel broadcast program options as described in claim 20 or any other claim or clause wherein said step of establishing a multitude of fluctuation optimized package option comprises the step of establishing at least one authorization data practicality optimized package option.
23. A method of providing numerous subscribers multi-channel broadcast program options as described in claim 22 or any other claim or clause wherein said step of establishing at least one authorization data practicality optimized package option comprises the step of establishing at least one transmission data size practicality optimized package option.
24. A method of providing numerous subscribers multi-channel broadcast program options as described in claim 22 or any other claim or clause wherein said step of establishing at least one authorization data practicality optimized package option comprises the steps of:
establishing a transmission data size optimized primary service directive; and
establishing a transmission data size optimized secondary service directive.
25. A method of providing numerous subscribers multi-channel broadcast program options as described in claim or any other claim or clause 22 wherein said step of establishing at least one authorization data practicality optimized package option comprises the step of establishing at least one overall subscriber transmission optimized package option.
26. A method of providing numerous subscribers multi-channel broadcast program options as described in claim 22 or any other claim or clause wherein said step of establishing at least one authorization data practicality optimized package option comprises the step of establishing at least one entitlement management message optimized package option.
27. A method of providing numerous subscribers multi-channel broadcast program options as described in claim 20 or any other claim or clause wherein said step of establishing a multitude of fluctuation optimized package options comprises the step of creating an accretion programming service composite demographic fluctuation optimized package option.

28. A method of providing numerous subscribers multi-channel broadcast program options as described in claim 20 or any other claim or clause wherein said step of establishing a multitude of fluctuation optimized package options comprises the step of establishing at least one á la carte optimized package option.

29. A method of providing numerous subscribers multi-channel broadcast program options as described in claim 28 or any other claim or clause wherein said step of establishing at least one á la carte optimized package option comprises the step of establishing at least one accretion-removal balanced package option.

30. A method of providing numerous subscribers multi-channel broadcast program options as described in claim 28 or any other claim or clause wherein said step of establishing at least one á la carte optimized package option comprises the step of establishing at least one accretion only optimized package option.

31. A method of providing numerous subscribers multi-channel broadcast program options as described in claim 21 or any other claim or clause wherein said step of securely indicating a primary multi-channel broadcast service directive comprises the step of selecting from a plurality of fluctuation optimized primary packages.

32. A method of providing numerous subscribers multi-channel broadcast program options as described in claim 1 or any other claim or clause and further comprising said step of utilizing a close package in creating said service composite.

33. A method of providing numerous subscribers multi-channel broadcast program options as described in claim 32 or any other claim or clause wherein said step of utilizing a close package in creating said service composite comprises the step of performing a functional operation on said close package to create said service composite.

34. A method of providing numerous subscribers multi-channel broadcast program options as described in claim 33 or any other claim or clause wherein said step of utilizing a close package in creating said service composite comprises the step of utilizing a closest lower package in creating said service composite.

35. A method of providing numerous subscribers multi-channel broadcast program options as described in claim 34 or any other claim or clause wherein said step of performing a functional operation on said close package to create said service composite comprises the step of accreting program options from said closest lower package.

36. A method of providing numerous subscribers multi-channel broadcast program options as described in claim 32 or any other claim or clause and further comprising the step of determining a close package at a communication headend.

37. A method of providing numerous subscribers multi-channel broadcast program options as described in claim 36 or any other claim or clause wherein said step of fluctuating said primary multi-channel broadcast service directive by said secondary multi-channel broadcast service directive to create a multi-channel broadcast service composite comprises the step of executing programmed functions a said receipt capability.

38. A method of providing numerous subscribers multi-channel broadcast program options as described in claim 32 or any other claim or clause wherein utilizing a close package in creating said service composite comprises the step of utilizing a closest package in creating said service composite.

39. A method of providing numerous subscribers multi-channel broadcast program options as described in claim 38 or any other claim or clause wherein said step of utilizing a close package in creating said service composite comprises the step of performing a functional operation on said closest package to create said service composite.

40. A method of providing numerous subscribers multi-channel broadcast program options as described in claim 1 or any other claim or clause wherein said step of authorizing service based on said multi-channel broadcast service composite comprises the step of transmitting a bandwidth discordant entitlement management message.

41. A method of providing numerous subscribers multi-channel broadcast program options as described in claim 1 or any other claim or clause wherein said step of authorizing service based on said multi-channel broadcast service composite comprises the step of transmitting an information abridged entitlement management message.

42. A method of providing numerous subscribers multi-channel broadcast program options as described in claim 1 or any other claim or clause wherein said step of authorizing service based on said multi-channel broadcast service composite comprises the step of transmitting an education entitlement management message.

43. A method of providing numerous subscribers multi-channel broadcast program options as described in claim 40, 41, or 42 or any other claim or clause wherein a step selected from the group consisting of transmitting a bandwidth discordant entitlement management message, transmitting an information abridged entitlement management message, and transmitting an education entitlement management message comprises the step of transmitting a less than full programming information entitlement management message.

44. A method of providing numerous subscribers multi-channel broadcast program options as described in claim 1 or any other claim or clause and further comprising the step of ubiquitously offering a large communication capacity of programming options to recipients.

45. A method of providing numerous subscribers multi-channel broadcast program options as described in claim 44 or any other claim or clause wherein said step of ubiquitously offering a large communication capacity of programming options to recipients comprises the step of offering substantially á la carte programming options to recipients.

46. A method of providing numerous subscribers multi-channel broadcast program options as described in claim 44 or any other claim or clause wherein said step of ubiquitously offering a large communication capacity of programming options to recipients comprises the step of offering alternative programming options selected from a group consisting of:
    offering at least about ten different alternative programming options to recipients,
    offering at least about fifteen different alternative programming options to recipients,
    offering at least about twenty different alternative programming options to recipients,
    offering at least about thirty different alternative programming options to recipients,
    offering at least about fifty different alternative programming options to recipients, and
    offering at least about one hundred different alternative programming options to recipients.

47. A method of providing numerous subscribers multi-channel broadcast program options as described in claim 1 or any other claim or clause wherein said step of authorizing service based on said multi-channel broadcast service composite comprises the step of transmitting a fluctuation entitlement management message.

48. A method of providing numerous subscribers multi-channel broadcast program options as described in claim 1 or any other claim or clause and further comprising the step of offering a recipient a package fluctuation option.

49. A method of providing numerous subscribers multi-channel broadcast program options as described in claim 48 or any other claim or clause wherein said step of offering a recipient a package fluctuation option comprises the step of offering a recipient an accretion programming option.

50. A method of providing numerous subscribers multi-channel broadcast program options as described in claim 49 or any other claim or clause wherein said step of offering a recipient a package fluctuation option comprises the step of economically incenting effectively limited programming changes.

51. A method of providing numerous subscribers multi-channel broadcast program options as described in claim 50 or any other claim or clause wherein said step of economically incenting effectively limited programming changes comprises the step of economically incenting programming changes selected from a group consisting of:
progressively effectively incenting no more than two programming changes; and
progressively effectively incenting no more than three programming changes; and
progressively effectively incenting no more than five programming changes.

52. A method of providing numerous subscribers multi-channel broadcast program options as described in claim 6 or any other claim or clause and further comprising the step of selecting a primary service directive from a group consisting of:
no more than three primary service directives;
no more than five primary service directives; and
no more than eight primary service directives.

53. A method of providing numerous subscribers multi-channel broadcast program options as described in claim 1 or any other claim or clause and further comprising the steps of:
presenting a large communication capacity of programming options to recipients; and
prompting recipient selection from said large communication capacity of programming options.

54. A method of providing numerous subscribers multi-channel broadcast program options comprising the steps of:
establishing a multi-channel broadcast service transmission capability;
establishing a multi-channel broadcast service receipt capability;
securely transmitting a terse high entropy entitlement management message to said multi-channel broadcast service receipt capability;
authorizing a highly variable recipient programming selection at said multi-channel broadcast service receipt capability; and
presenting said recipient programming selection as an authorized multi-channel broadcast service to a recipient.

55. A method of providing numerous subscribers multi-channel broadcast program options as described in claim 1 or any other claim or clause wherein said step of authorizing a highly variable recipient programming selection at said multi-channel broadcast service receipt capability comprises the step of securely authorizing service based on said multi-channel broadcast service composite.

56. A method of providing numerous subscribers multi-channel broadcast program options as described in claim 54 or any other claim or clause wherein said step of authorizing a highly variable recipient programming selection at said multi-channel broadcast service receipt capability comprises the steps of indicating a primary multi-channel broadcast service directive; indicating a secondary multi-channel broadcast service directive; and fluctuating said primary multi-channel broadcast service directive by said secondary multi-channel broadcast service directive to create a multi-channel broadcast service composite.

57. A method of providing numerous subscribers multi-channel broadcast program options as described in claim 56 or any other claim or clause wherein said step of authorizing a highly variable recipient programming selection at said multi-channel broadcast service receipt capability comprises the step of securely authorizing a highly variable recipient programming selection of said multi-channel broadcast service receipt capability and wherein said step of indicating a primary multi-channel broadcast service directive comprises the step of securely indicating a primary multi-channel broadcast service directive, wherein said step of indicating a secondary multi-channel broadcast service directive comprises the step of securely indicating a secondary multi-channel broadcast service directive.

58. A method of providing numerous subscribers multi-channel broadcast program options as described in claim 54 or any other claim or clause wherein said step of authorizing a highly variable recipient programming selection at said multi-channel broadcast service receipt capability comprises the step of rapidly authorizing said highly variable recipient programming selection across a large subscriber base in an abridged total authorization time that is substantially less than the traditional time for such a subscriber base for highly variable recipient programming selections.

59. A method of providing numerous subscribers multi-channel broadcast program options as described in claim 58 or any other claim or clause wherein said step of rapidly authorizing said highly variable recipient programming selection across a large subscriber base in an abridged total authorization time comprises the step of rapidly authorizing said highly variable recipient programming selection across a large subscriber base selected from a group consisting of:
authorizing said highly variable recipient programming selection at a rate faster than at least about eight thousand customers per second;
authorizing said highly variable recipient programming selection at a rate faster than at least about ten thousand customers per second;
authorizing said highly variable recipient programming selection at a rate faster than at least about fifteen thousand customers per second; and
authorizing said highly variable recipient programming selection at a rate faster than at least about twenty thousand customers per second.

60. A method of providing numerous subscribers multi-channel broadcast program options as described in claim 58 or any other claim or clause wherein said step of rapidly authorizing said highly variable recipient programming selection across a large subscriber base in an abridged total authorization time that is substantially less than the traditional time for such a subscriber base for highly variable recipient programming selections comprises a step selected from a group consisting of:
authorizing said highly variable recipient programming selection in a time less than or equal to about ten seconds per hundred thousand customers;
authorizing said highly variable recipient programming selection in a time less than or equal to about seven seconds per hundred thousand customers; and
authorizing said highly variable recipient programming selection in a time less than or equal to about five seconds per hundred thousand customers.

61. A method of providing numerous subscribers multi-channel broadcast program options as described in claim 59 or any other claim or clause wherein said step of authorizing a highly variable recipient programming selection at said multi-channel broadcast service receipt capability comprises the step of authorizing a programming selection having greater than traditional program variance options.

62. A method of providing numerous subscribers multi-channel broadcast program options as described in claim 54 or any other claim or clause wherein said step of securely transmitting a terse high entropy entitlement management message to said multi-channel broadcast service receipt capability comprises the step of securely transmitting a bandwidth discordant entitlement management message to said multi-channel broadcast service receipt capability.

63. A method of providing numerous subscribers multi-channel broadcast program options as described in claim 54 or any other claim or clause wherein said step of securely transmitting a terse high entropy entitlement management message to said multi-channel broadcast service receipt capability comprises the step of securely transmitting an information abridged entitlement management message to said multi-channel broadcast service receipt capability.

64. A method of providing numerous subscribers multi-channel broadcast program options as described in claim 54 or any other claim or clause wherein said step of securely transmitting a terse high entropy entitlement management message to said multi-channel broadcast service receipt capability comprises the step of securely transmitting an education entitlement management message to said multi-channel broadcast service receipt capability.

65. A method of providing numerous subscribers multi-channel broadcast program options as described in claim 62, 63, or 64 or any other claim or clause wherein a step selected from the group consisting of securely transmitting a bandwidth discordant entitlement management message, securely transmitting on information abridged entitlement management message, and securely transmitting an education entitlement management message comprises the step of securely transmitting less a than full programming information entitlement management message.

66. A method of providing numerous subscribers multi-channel broadcast program options as described in claim 54 or any other claim or clause and further comprising the step of ubiquitously offering large bandwidth programming options.

67. A method of providing numerous subscribers multi-channel broadcast program options as described in claim 66 or any other claim or clause wherein said step of ubiquitously offering large bandwidth programming options comprises the step of offering substantially á la carte programming options to recipients.

68. A method of providing numerous subscribers multi-channel broadcast program options as described in claim 66 or any other claim or clause wherein said step of ubiquitously offering large bandwidth programming options comprises the step of offering alternative programming options selected from a group consisting of:
offering at least about five different alternative programming options to recipients,
offering at least about ten different alternative programming options to recipients,
offering at least about fifteen different alternative programming options to recipients,
offering at least about twenty different alternative programming options to recipients,
offering at least about thirty different alternative programming options to recipients,
offering at least about fifty different alternative programming options to recipients, and
offering at least about one hundred different alternative programming options to recipients.

69. A method of providing numerous subscribers multi-channel broadcast program options as described in claim 54 or any other claim or clause wherein said step of securely transmitting a terse high entropy entitlement management message to said multi-channel broadcast service receipt capability comprises the step of securely transmitting a fluctuation entitlement management message to said multi-channel broadcast service receipt capability.

70. A method of providing numerous subscribers multi-channel broadcast program options as described in claim 69 or any other claim or clause wherein said step of securely transmitting a fluctuation entitlement management message to said multi-channel broadcast service receipt capability comprises the steps of:
indicating a primary multi-channel broadcast service directive;
indicating a secondary multi-channel broadcast service directive; and
fluctuating said primary multi-channel broadcast service directive by said secondary multi-channel broadcast service directive to create a multi-channel broadcast service composite.

71. A method of providing numerous subscribers multi-channel broadcast program options as described in claim 54 or any other claim or clause and further comprising storing at least one nonce multi-channel broadcast program collective at said multi-channel broadcast service receipt capability, and wherein said step of securely transmitting a terse high entropy entitlement management message to said multi-channel broadcast service receipt capability comprises the step of securely transmitting a nonce based multi-channel broadcast entitlement management message to said multi-channel broadcast service receipt capability.

72. A method of providing numerous subscribers multi-channel broadcast program options as described in claim 71 or any other claim or clause wherein said step of storing at least one nonce multi-channel broadcast program collective at said multi-channel broadcast service receipt capability comprises the step of providing said multi-channel broadcast service receipt capability with at least one nonce multi-channel broadcast program collective.

73. A method of providing numerous subscribers multi-channel broadcast program options as described in claim 71 or any other claim or clause wherein said step of storing at least one nonce multi-channel broadcast program collective at said multi-channel broadcast service receipt capability comprises the step of downloading at least one nonce multi-channel broadcast program collective to said multi-channel broadcast service receipt capability.

74. A method of providing numerous subscribers multi-channel broadcast program options as described in claim 71 or any other claim or clause wherein said step of storing at least one nonce multi-channel broadcast program collective at said multi-channel broadcast service receipt capability comprises the step of storing at least one alterable nonce multi-channel broadcast program collective at said multi-channel broadcast service receipt capability.

75. A method of providing numerous subscribers multi-channel broadcast program options comprising the steps of:
    establishing a multi-channel broadcast service transmission capability;
    establishing a multi-channel broadcast service receipt capability;
    storing at least one nonce multi-channel broadcast program collective at said multi-channel broadcast service receipt capability;
    securely transmitting a nonce based multi-channel broadcast entitlement management message to said multi-channel broadcast service receipt capability;
    authorizing a recipient programming selection at said multi-channel broadcast service receipt capability; and
    presenting said recipient programming selection as an authorized multi-channel broadcast service to said recipient.

76. A method of providing numerous subscribers multi-channel broadcast program options as described in claim 75 or any other claim or clause wherein said step of authorizing a recipient programming selection at said multi-channel broadcast service receipt capability comprises the step of securely authorizing service based on said multi-channel broadcast service composite.

77. A method of providing numerous subscribers multi-channel broadcast program options as described in claim 75 or any other claim or clause wherein said step of authorizing a recipient programming selection at said multi-channel broadcast service receipt capability comprises the steps of indicating a primary multi-channel broadcast service directive, indicating a secondary multi-channel broadcast service directive, and fluctuating said primary multi-channel broadcast service directive by said secondary multi-channel broadcast service directive to create a multi-channel broadcast service composite.

78. A method of providing numerous subscribers multi-channel broadcast program options as described in claim 77 or any other claim or clause wherein said step of authorizing a recipient programming selection at said multi-channel broadcast service receipt capability comprises the step of securely authorizing a recipient programming selection of said multi-channel broadcast service recipient capability, and wherein said step of indicating a primary multi-channel broadcast service directive comprises the step of securely indicating a primary multi-channel broadcast service directive, and wherein said step of indicating a secondary multi-channel broadcast service directive comprises the step of securely indicating a secondary multi-channel broadcast service directive.

79. A method of providing numerous subscribers multi-channel broadcast program options as described in claim 75 or any other claim or clause wherein said step of storing at least one nonce multi-channel broadcast program collective at said multi-channel broadcast service receipt capability comprises the step of storing at least one minimum customer base package nonce multi-channel broadcast program collective at said multi-channel broadcast service receipt capability.

80. A method of providing numerous subscribers multi-channel broadcast program options as described in claim 75 or any other claim or clause wherein said step of storing at least one nonce multi-channel broadcast program collective at said multi-channel broadcast service receipt capability comprises the step of storing at least one average customer base package nonce multi-channel broadcast program collective at said multi-channel broadcast service receipt capability.

81. A method of providing numerous subscribers multi-channel broadcast program options as described in claim 75 or any other claim or clause wherein said step of securely transmitting a nonce based multi-channel broadcast entitlement management message to said multi-channel broadcast service receipt capability comprises the step of securely transmitting a terse high entropy entitlement management message to said multi-channel broadcast service receipt capability.

82. A method of providing numerous subscribers multi-channel broadcast program options as described in claim 75 or any other claim or clause wherein said step of securely transmitting a nonce based multi-channel broadcast entitlement management message to said multi-channel broadcast service receipt capability comprises the step of securely transmitting a fluctuation entitlement management message to said multi-channel broadcast service receipt capability.

83. A method of providing numerous subscribers multi-channel broadcast program options as described in claim 75 or any other claim or clause wherein said step of storing at least one nonce multi-channel broadcast program collective at said multi-channel broadcast service receipt capability comprises the step of providing said multi-channel broadcast service receipt capability with at least one nonce multi-channel broadcast program collective.

84. A method of providing numerous subscribers multi-channel broadcast program options as described in claim 75 or any other claim or clause wherein said step of storing at least one nonce multi-channel broadcast program collective at said multi-channel broadcast service receipt capability comprises the step of downloading at least one multi-channel broadcast program collective to said multi-channel broadcast service receipt capability.

85. A method of providing numerous subscribers multi-channel broadcast program options as described in claim 75 or any other claim or clause and further comprising the step of downloading at least one nonce multi-channel broadcast program collective to said multi-channel broadcast service receipt capability.

86. A method of providing numerous subscribers multi-channel broadcast program options as described in claim 75 or any other claim or clause wherein said step of storing at least one nonce multi-channel broadcast program collective at said multi-channel broadcast service receipt capability comprises the step of storing at least one alterable nonce multi-channel broadcast program collective at said multi-channel broadcast service receipt capability.

87. A method of providing numerous subscribers multi-channel broadcast program options as described in claim 82 or any other claim or clause and further comprising the steps of:
    indicating a primary multi-channel broadcast service directive;
    indicating a secondary multi-channel broadcast service directive; and
    fluctuating said primary multi-channel broadcast service directive by said secondary multi-channel broadcast service directive to create a multi-channel broadcast service composite.

88. A method of providing numerous subscribers multi-channel broadcast program options as described in claim 78 or any other claim or clause wherein said step of storing at least one nonce multi-channel broadcast program collective at said multi-channel broadcast service receipt capability comprises the step of storing at least one nonce multi-channel broadcast program collective at said multi-channel broadcast service receipt capability.

89. A method of providing numerous subscribers multi-channel broadcast program options as described in claim 88 or any other claim or clause wherein said step of storing at least one nonce multi-channel broadcast program collective at said multi-channel broadcast service receipt capability comprises the step of storing at least one nonce multi-channel broadcast program collective in a recipient receiver.

90. A method of providing numerous subscribers multi-channel broadcast program options as described in claim 89 or any other claim or clause wherein said step of storing at least one nonce multi-channel broadcast program collective in a recipient receiver comprises the step of storing at least one nonce multi-channel broadcast program collective in a recipient receiver during manufacture.

91. A method of providing numerous subscribers multi-channel broadcast program options as described in claim 89 or any other claim or clause wherein said step of storing at least one nonce multi-channel broadcast program collective in a recipient receiver comprises the step of storing at least one nonce multi-channel broadcast program collective in a recipient receiver during customer operation of said receiver.

92. A method of providing numerous subscribers multi-channel broadcast program options as described in claim 75 or any other claim or clause wherein said step of storing at least one nonce multi-channel broadcast program collective at said multi-channel broadcast service receipt capability comprises the step of storing a plurality of nonce multi-channel broadcast program collectives at said multi-channel broadcast service receipt capability.

93. A method of providing numerous subscribers multi-channel broadcast program options as described in claim 92 or any other claim or clause wherein said step of storing a plurality of nonce multi-channel broadcast program collectives at said multi-channel broadcast service receipt capability comprises the step of storing at least about eight nonce multi-channel broadcast program collectives at said multi-channel broadcast service receipt capability.

94. A method of providing numerous subscribers multi-channel broadcast program options as described in claim 92 or any other claim or clause wherein said step of storing a plurality of nonce multi-channel broadcast program collectives at said multi-channel broadcast service receipt capability comprises the step of storing at least about four nonce multi-channel broadcast program collectives at said multi-channel broadcast service receipt capability.

95. A method of providing numerous subscribers multi-channel broadcast program options as described in claim 92 or any other claim or clause wherein said step of storing a plurality of nonce multi-channel broadcast program collectives at said multi-channel broadcast service receipt capability comprises the step of storing at least about two multi-channel broadcast program collectives at said multi-channel broadcast service receipt capability.

96. A method of providing numerous subscribers multi-channel broadcast program options as described in claim 92 or any other claim or clause wherein said step of securely transmitting a nonce based multi-channel broadcast entitlement management message to said multi-channel broadcast service receipt capability comprises the step of securely transmitting a nonce identifying entitlement management message to said multi-channel broadcast service receipt capability.

97. A method of providing numerous subscribers multi-channel broadcast program options comprising the steps of:
establishing a multi-channel broadcast service transmission capability;
establishing a multi-channel broadcast service receipt capability;
connecting to an independent information transmission path;
inserting multi-channel broadcast conditional access operating system information into said independent information transmission path;
securely transmitting said multi-channel broadcast conditional access operating system information to said multi-channel broadcast service receipt capability;
establishing an operational multi-channel broadcast conditional access operating system at said multi-channel broadcast service receipt capability;
receiving programming content information at said multi-channel broadcast service receipt capability;
authorizing a programming at said multi-channel broadcast service receipt capability through operation of said operational multi-channel broadcast conditional access operating system; and
presenting said programming as an authorized service at said multi-channel broadcast service receipt capability.

98. A method of providing numerous subscribers multi-channel broadcast options as described in claim 97 or any other claim or clause wherein said step of authorizing a programming at said multi-channel broadcast service receipt capability through operation of said operational multi-channel broadcast conditional access operating system comprises the step of securely authorizing a programming of said multi-channel broadcast service recipient capability through operation of said operational multi-channel broadcast conditional access operating system.

99. A method of providing numerous subscribers multi-channel broadcast program options as described in claim 97 or any other claim or clause wherein said step of authorizing a programming at said multi-channel broadcast service receipt capability through operation of said operational multi-channel broadcast conditional access operating system comprises the steps of indicating a primary multi-channel broadcast service directive, indicating a secondary multi-channel broadcast service directive, and fluctuating said primary multi-channel broadcast service directive by said secondary multi-channel broadcast service directive to create a multi-channel broadcast service composite.

100. A method of providing numerous subscribers multi-channel broadcast options as described in claim 99 or any other claim or clause wherein said step of authorizing a programming at said multi-channel broadcast service receipt capability through operation of said operational multi-channel broadcast conditional access operating system comprises the step of securely authorizing a programming at said multi-channel broadcast service receipt capability through operation of said operational multi-channel broadcast conditional access operating system, and wherein said step of indicating a primary multi-channel broadcast service directive comprises the step of securely indicating a primary multi-channel broadcast service directive and wherein said step of indicating a secondary multi-channel broadcast service directive comprises the step of securely indicating a secondary multi-channel broadcast service directive.

101. A method of providing numerous subscribers multi-channel broadcast program options as described in claim 97 or any other claim or clause wherein said step of connecting to an independent information transmission path comprises the step of utilizing a conditional access system independent information transmission path.

102. A method of providing numerous subscribers multi-channel broadcast program options as described in claim 97 or any other claim or clause wherein said step of authorizing a programming at said multi-channel broadcast service receipt capability comprises the step of utilizing a secure information transmission path.

103. A method of providing numerous subscribers multi-channel broadcast program options as described in claim 101 or any other claim or clause said step of wherein utilizing a secure information transmission path comprises the step of utilizing a secure socket layer protocol transmission path.

104. A method of providing numerous subscribers multi-channel broadcast program options as described in claim 97 or any other claim or clause and further comprising the step of enacting a conditional access system particular security system on said independent information transmission path.

105. A method of providing numerous subscribers multi-channel broadcast program options as described in claim 97 or any other claim or clause wherein said step of connecting to an independent information transmission path comprises the step of connecting to a one-way communication path.

106. A method of providing numerous subscribers multi-channel broadcast program options comprising the steps of:
establishing a multi-channel broadcast service transmission capability;
establishing a multi-channel broadcast service receipt capability;
ubiquitously offering substantially á la carte multi-channel broadcast programming options to recipients;
prompting recipient selection from said substantially á la carte multi-channel broadcast programming options;
transmitting a multi-channel broadcast entitlement management message to said service receipt capability;
securely authorizing a highly variable recipient programming selection at said multi-channel broadcast service receipt capability based on said multi-channel broadcast entitlement management message; and
presenting service as an authorized service to a recipient.

107. A method of providing numerous subscribers multi-channel broadcast program options as described in claim 106 or any other claim or clause wherein said step of securely authorizing a highly variable recipient programming selection at said multi-channel broadcast service receipt capability based on said multi-channel broadcast entitlement management message comprises the step of utilizing a rapid secure authorization system to securely authorize said highly variable recipient programming selection at said service receipt capability.

108. A method of providing numerous subscribers multi-channel broadcast program options as described in claim 107 or any other claim or clause wherein said step of securely authorizing a highly variable recipient programming selection at said multi-channel broadcast service receipt capability based on said multi-channel broadcast entitlement management message comprises the step of utilizing a rapid secure authorization system selected from a group consisting of:
a secure authorization system operating at an average authorization rate of at least about eight thousand customers per second to securely authorize said highly variable recipient programming selection at a plurality of recipients;
a secure authorization system operating at an average authorization rate of at least about ten thousand customers per second to securely authorize said highly variable recipient programming selection at a plurality of recipients; and
a secure authorization system operating at an average authorization rate of at least about twenty thousand customers per second to securely authorize said highly variable recipient programming selection at a plurality of recipients.

109. A method of providing numerous subscribers multi-channel broadcast program options as described in claim 107 or any other claim or clause wherein said step of utilizing a rapid secure authorization system comprises a step selected from the group consisting of:
a secure authorization system taking no more than on average ten seconds to securely authorize each hundred thousand customers;
a secure authorization system taking no more than on average seven seconds to securely authorize each hundred thousand customers; and
a secure authorization system taking no more than on average five seconds to securely authorize each hundred thousand customers.

110. A method of providing numerous subscribers multi-channel broadcast program options as described in claim 108 or any other claim or clause wherein said step of utilizing a rapid secure authorization system to securely authorize said highly variable recipient programming selection at said service receipt capability comprises the step of securely authorizing more than a traditional programming variance across a plurality of customers.

111. A method of providing numerous subscribers multi-channel broadcast program options as described in claim 106 or any other claim or clause wherein said step of transmitting a multi-channel broadcast entitlement management message to said service receipt capability comprises the step of securely transmitting a terse high entropy entitlement management message to said multi-channel broadcast service receipt capability.

112. A method of providing numerous subscribers multi-channel broadcast program options as described in claim 111 or any other claim or clause wherein said step of securely authorizing a highly variable recipient programming selection of said multi-channel broadcast service receipt capability based on said multi-channel broadcast entitlement management message comprises the steps of indicating a primary multi-channel broadcast service directive, indicating a secondary multi-channel broadcast service directive, and fluctuating said primary multi-channel broadcast service directive by said secondary multi-channel broadcast service directive to create a multi-channel broadcast service composite.

113. A method of providing numerous subscribers multi-channel broadcast program options as described in claims 112 or any other claim or clause wherein said step of transmitting a multi-channel broadcast entitlement management message to said service receipt capability comprises the step of transmitting a less than full programming information entitlement management message.

114. A method of providing numerous subscribers multi-channel broadcast program options as described in claim 111 or any other claim or clause wherein said steps of indicating a primary multi-channel broadcast service directive and indicating a secondary multi-channel broadcast service directive are accomplished at a communication headend.

115. A method of providing numerous subscribers multi-channel broadcast program options as described in claim 111 or any other claim or clause wherein said step of fluctuating said primary multi-channel broadcast service directive by said secondary multi-channel broadcast service directive to create a multi-channel broadcast service composite comprises the step of executing at a set top box.

116. A method of providing numerous subscribers multi-channel broadcast program options as described in claim 106 or any other claim or clause and further comprising the step of storing at least one nonce program collective at said service receipt capability, and wherein said step of transmitting a multi-channel broadcast entitlement management message to said service receipt capability comprises the step of transmitting a nonce based entitlement management message to said service receipt capability.

117. A method of providing numerous subscribers multi-channel broadcast program options as described in claim 106 or any other claim or clause wherein said step of transmitting a multi-channel broadcast entitlement management message to said service receipt capability comprises the step of transmitting a fluctuation entitlement management message.

118. A numerous subscriber multi-channel broadcast program option system comprising:
a communication headend;
a multi-channel broadcast program option selector;
a primary multi-channel broadcast service directive indicator responsive to said multi-channel broadcast program option selector;
a secondary multi-channel broadcast service directive indicator responsive to said multi-channel broadcast program option selector;
a multi-channel broadcast entitlement management message transmitter; at least one communication transmission path responsive to said communication headend;
a multi-channel broadcast receiver responsive to said communication transmission path;
a multi-channel broadcast programming fluctuation processor responsive to said primary multi-channel broadcast service directive indicator and said secondary multi-channel broadcast service directive indicator and which establishes a multi-channel broadcast service composite; and
a recipient service presentation element responsive to said multi-channel broadcast programming fluctuation processor.

119. A numerous subscriber multi-channel broadcast program option system as described in claim 118 or any other claim or clause wherein the step of a multi-channel broadcast entitlement management message transmitter comprises a secure multi-channel broadcast entitlement management message transmitter.

120. A numerous subscriber multi-channel broadcast program option system as described in claim 119 or any other claim or clause wherein the step of primary multi-channel broadcast service directive indicator comprises a secure primary multi-channel broadcast service directive indicator, and wherein the step of secondary multi-channel broadcast service directive indicator comprises a secure secondary multi-channel broadcast service directive indicator.

121. A numerous subscriber multi-channel broadcast program option system as described in claim 118 or any other claim or clause wherein the step of multi-channel broadcast programming fluctuation processor comprises a multi-channel broadcast programming fluctuation processor programmed to operate on information from said primary service indicator by information from said secondary service indicator.

122. A numerous subscriber multi-channel broadcast program option system as described in claim 121 or any other claim or clause wherein the step of recipient service presentation element comprises a fundamental operative multi-channel broadcast programming fluctuation processor.

123. A numerous subscriber multi-channel broadcast program option system as described in claim 121 or any other claim or clause wherein said recipient service presentation element comprises a multiple mathematical operation fluctuation processor.

124. A numerous subscriber multi-channel broadcast program option system as described in claim 123 or any other claim or clause wherein the step of multiple mathematical operation fluctuation processor comprises a mathematical operation and inverse mathematical operation fluctuation processor.

125. A numerous subscriber multi-channel broadcast program option system as described in claim 118 or any other claim or clause wherein the step of multi-channel broadcast programming fluctuation processor comprises an accretion programming service composite processor.

126. A numerous subscriber multi-channel broadcast program option system as described in claim 125 or any other claim or clause wherein the step of accretion programming service composite processor comprises an individual program accretion programming service composite processor.

127. A numerous subscriber multi-channel broadcast program option system as described in claim 125 or 126 or any other claim or clause wherein the step of individual program accretion programming service composite processor comprises a grouped programming accretion processor.

128. A numerous subscriber multi-channel broadcast program option system as described in claim 118 or any other claim or clause wherein the step of multi-channel broadcast programming fluctuation processor comprises a removal programming service composite processor.

129. A numerous subscriber multi-channel broadcast program option system as described in claim 128 or any other claim or clause wherein the step of removal programming service composite processor comprises an individual program removal programming service composite processor.

130. A numerous subscriber multi-channel broadcast program option system as described in claim 128 or 129 or any other claim or clause wherein the step of removal programming service composite processor comprises a grouped programming removal processor.

131. A numerous subscriber multi-channel broadcast program option system as described in claim 118 or any other claim or clause wherein the step of multi-channel broadcast programming fluctuation processor comprises:

an accretion programming service composite processor; and a removal programming service composite processor.

132. A numerous subscriber multi-channel broadcast program option system as described in claim 118 or any other claim or clause and further comprising a tertiary service directive indicator, and wherein multi-channel broadcast programming fluctuation processor is responsive to said tertiary service directive indicator.

133. A numerous subscriber multi-channel broadcast program option system as described in claim 118 or any other claim or clause wherein the step of multi-channel broadcast program option selector comprises a fluctuation optimized package multi-channel broadcast program option selector.

134. A numerous subscriber multi-channel broadcast program option system as described in claim 133 or any other claim or clause wherein the step of fluctuation optimized package multi-channel broadcast program option selector comprises a fluctuation optimized primary package multi-channel broadcast program option selector.

135. A numerous subscriber multi-channel broadcast program option system as described in claim 133 or any other claim or clause wherein the step of fluctuation optimized package multi-channel broadcast program option selector comprises an authorization data practicality optimized multi-channel broadcast program option selector.

136. A numerous subscriber multi-channel broadcast program option system as described in claim 135 or any other claim or clause wherein the step of authorization data practicality optimized multi-channel broadcast program option selector comprises a transmission data size optimized multi-channel broadcast program option selector.

137. A numerous subscriber multi-channel broadcast program option system as described in claim 135 or any other claim or clause wherein the step of authorization data practicality optimized multi-channel broadcast program option selector comprises an overall subscriber transmission optimized multi-channel broadcast program option selector.

138. A numerous subscriber multi-channel broadcast program option system as described in claim 135 or any other claim or clause wherein the step of authorization data practicality optimized multi-channel broadcast program option selector comprises an entitlement management message optimized multi-channel broadcast program option selector.

139. A numerous subscriber multi-channel broadcast program option system as described in claim 133 or any other claim or clause wherein the step of fluctuation optimized package multi-channel broadcast program option selector comprises a program demographic fluctuation optimized multi-channel broadcast program option selector.

140. A numerous subscriber multi-channel broadcast program option system as described in claim 133 or any other claim or clause wherein the step of fluctuation optimized package multi-channel broadcast program option selector comprises an á la carte multi-channel broadcast program option selector.

141. A numerous subscriber multi-channel broadcast program option system as described in claim 140 or any other claim or clause wherein the step of á la carte multi-channel broadcast program option selector comprises an accretion-removal balanced multi-channel broadcast program option selector.

142. A numerous subscriber multi-channel broadcast program option system as described in claim 140 or any other claim or clause wherein the step of á la carte multi-channel broadcast program option selector comprises an accretion only multi-channel broadcast program option selector.

143. A numerous subscriber multi-channel broadcast program option system as described in claim 118 or any other claim or clause wherein the step of multi-channel broadcast program option selector comprises a close package multi-channel broadcast program option selector.

144. A numerous subscriber multi-channel broadcast program option system as described in claim 143 or any other claim or clause wherein the step of close package multi-channel broadcast program option selector comprises a closest lower package multi-channel broadcast program option selector.

145. A numerous subscriber multi-channel broadcast program option system as described in claim 118 or any other claim or clause wherein multi-channel broadcast programming fluctuation processor comprises a multi-channel broadcast receiver processor.

146. A numerous subscriber multi-channel broadcast program option system as described in claim 118 or any other claim or clause wherein the step of multi-channel broadcast entitlement management message transmitter comprises a bandwidth discordant entitlement management message transmitter.

147. A numerous subscriber multi-channel broadcast program option system as described in claim 118 or any other claim or clause wherein the step of multi-channel broadcast entitlement management message transmitter comprises an information abridged entitlement management message transmitter.

148. A numerous subscriber multi-channel broadcast program option system as described in claim 118 or any other claim or clause wherein the step of multi-channel broadcast entitlement management message transmitter comprises an education entitlement management message transmitter.

149. A numerous subscriber multi-channel broadcast program option system as described in claim 146, 147, or 148 or any other claim or clause wherein a member of the group consisting of a bandwidth discordant entitlement management message transmitter, an information abridged entitlement management message transmitter, and an education entitlement management message transmitter, comprises a less than full programming information entitlement management message transmitter.

150. A numerous subscriber multi-channel broadcast program option system as described in claim 118 or any other claim or clause wherein the step of multi-channel broadcast program option selector comprises a multi-channel broadcast program option selector selected from a group consisting of:

an at least about ten different alternative programming options multi-channel broadcast program option selector, an at least about fifteen different alternative programming options multi-channel broadcast program option selector, an at least about twenty different alternative programming options multi-channel broadcast program option selector, an at least about thirty different alternative programming options multi-channel broadcast program option selector, an at least about fifty different alternative programming options multi-channel broadcast program option selector, and an at least about one hundred different alternative programming options multi-channel broadcast program option selector.

151. A numerous subscriber multi-channel broadcast program option system as described in claim 118 or any other claim or clause wherein the step of multi-channel broadcast entitlement management message transmitter comprises a fluctuation entitlement management message transmitter 152. A numerous subscriber multi-channel broadcast program option system comprising:
a communication headend;
a highly variable recipient programming option selector;
a secure high entropy multi-channel broadcast entitlement management message transmitter responsive to said highly variable recipient programming option selector;
at least one recipient communication transmission path responsive to said communication headend;
a multi-channel broadcast receiver responsive to said communication transmission path; and
a recipient service presentation element responsive to said multi-channel broadcast entitlement management message transmitter.

153. A numerous subscriber multi-channel broadcast program option system as described in claim 152 or any other claim or clause and further comprising a secure multi-channel broadcast programming authorization processor responsive to said secure high entropy entitlement management message transmitter.

154. A numerous subscriber multi-channel broadcast program option system as described in claim 152 or any other claim or clause and further comprising:
a primary multi-channel broadcast service directive indicator responsive to said multi-channel broadcast program option selector;
a secondary multi-channel broadcast service directive indicator responsive to said multi-channel broadcast program option selector; and
a multi-channel broadcast programming fluctuation processor responsive to said primary multi-channel broadcast service directive indicator and said secondary multi-channel broadcast service directive indicator.

155. A numerous subscriber multi-channel broadcast program option system as described in claim 154 or any other claim or clause wherein the step of primary multi-channel broadcast service directive indicator comprises a secure primary multi-channel broadcast service directive indicator, and wherein said secondary multi-channel broadcast service directive indicator comprises a secure secondary multi-channel broadcast service directive indicator.

156. A numerous subscriber multi-channel broadcast program option system as described in claim 152 or any other claim or clause and further comprising a rapid authorization system that authorizes a highly variable recipient programming selection across a large subscriber base in an abridged total authorization time that is substantially less than the traditional time for such a subscriber base for highly variable recipient programming selections.

157. A numerous subscriber multi-channel broadcast program option system as described in claim 156 or any other claim or clause wherein the step of rapid authorization system comprises a rapid authorization system selected from a group consisting of:
a rapid authorization system capable of authorizing said highly variable recipient programming selection at a rate faster than at least about eight thousand customers per second;
a rapid authorization system capable of authorizing said highly variable recipient programming selection at a rate faster than at least about ten thousand customers per second;
a rapid authorization system capable of authorizing said highly variable recipient programming selection at a rate faster than at least about fifteen thousand customers per second; and
a rapid authorization system capable of authorizing said highly variable recipient programming selection at a rate faster than at least about twenty thousand customers per second.

158. A numerous subscriber multi-channel broadcast program option system as described in claim 156 or any other claim or clause wherein the step of rapid authorization system comprises a rapid authorization system selected from a group consisting of:
a rapid authorization system capable of authorizing said highly variable recipient programming selection at a rate faster than at least about ten seconds per hundred thousand customers;
a rapid authorization system capable of authorizing said highly variable recipient programming selection at a rate faster than at least about seven seconds per hundred thousand customers; and
a rapid authorization system capable of authorizing said highly variable recipient programming selection at a rate faster than at least about five seconds per hundred thousand customers.

159. A numerous subscriber multi-channel broadcast program option system as described in claim 157 or any other claim or clause wherein the step of highly variable recipient programming option selector comprises a high variation multi-channel broadcast program option selector having greater than traditional program variance options.

160. A numerous subscriber multi-channel broadcast program option system as described in claim 152 or any other claim or clause wherein said secure high entropy multi-channel broadcast entitlement management message transmitter responsive to said highly variable recipient programming option selector comprises a bandwidth discordant entitlement management message transmitter.

161. A method of providing numerous subscribers multi-channel broadcast program options as described in claim 152 or any other claim or clause wherein said secure high entropy multi-channel broadcast entitlement management message transmitter responsive to said highly variable recipient programming option selector comprises an information abridged entitlement management message transmitter.

162. A numerous subscriber multi-channel broadcast program option system as described in claim 152 or any other claim or clause wherein said secure high entropy multi-channel broadcast entitlement management message transmitter responsive to said highly variable recipient programming option selector comprises an education entitlement management message transmitter.

163. A numerous subscriber multi-channel broadcast program option system as described in claim 160, 161, or 162 or any other claim or clause wherein a member of the group consisting of a bandwidth discordant entitlement management message transmitter, on information abridged entitlement management message transmitter, and on education entitlement management message transmitter comprises a less than full programming information entitlement management message transmitter.

164. A numerous subscriber multi-channel broadcast program option system as described in claim 152 or any other claim or clause wherein the step of highly variable recipient programming option selector comprises a substantially á la carte high variation multi-channel broadcast program option selector.

165. A numerous subscriber multi-channel broadcast program option system as described in claim 152 or any other claim or clause wherein said highly variable recipient programming option selector comprises a multi-channel broadcast program option selector selected from a group consisting of:
an at least about five different alternative programming options multi-channel broadcast program option selector,
an at least about ten different alternative programming options multi-channel broadcast program option selector,
an at least about fifteen different alternative programming options multi-channel broadcast program option selector,
an at least about twenty different alternative programming options multi-channel broadcast program option selector,
an at least about thirty different alternative programming options multi-channel broadcast program option selector,
an at least about fifty different alternative programming options multi-channel broadcast program option selector, and
an at least about one hundred different alternative programming options multi-channel broadcast program option selector.

166. A numerous subscriber multi-channel broadcast program option system as described in claim 152 or any other claim or clause wherein the step of secure high entropy multi-channel broadcast entitlement management message transmitter responsive to said highly variable recipient programming option selector comprises a secure fluctuation entitlement management message transmitter.

167. A numerous subscriber multi-channel broadcast program option system as described in claim 166 or any other claim or clause wherein the step of secure fluctuation entitlement management message transmitter comprises:
a primary multi-channel broadcast service directive indicator responsive to said multi-channel broadcast program option selector;
a secondary multi-channel broadcast service directive indicator responsive to said multi-channel broadcast program option selector; and
a multi-channel broadcast programming fluctuation processor responsive to said primary multi-channel broadcast service directive indicator and said secondary multi-channel broadcast service directive indicator.

168. A numerous subscriber multi-channel broadcast program option system as described in claim 152 or any other claim or clause and further comprising:
a multi-channel broadcast programming authorization processor; and
a nonce programming collective storage to which said multi-channel broadcast programming authorization processor is responsive.

169. A numerous subscriber multi-channel broadcast program option system as described in claim 168 or any other claim or clause wherein the step of nonce programming collective storage comprises a manufacture input nonce programming collective storage.

170. A numerous subscriber multi-channel broadcast program option system as described in claim 168 or any other claim or clause wherein the step of nonce programming collective storage comprises a downloadable nonce programming collective storage.

171. A numerous subscriber multi-channel broadcast program option system as described in claim 168 or any other claim or clause wherein the step of nonce programming collective storage comprises an alterable nonce programming collective storage.

172. A numerous subscriber multi-channel broadcast program option system comprising:
a communication headend;
a nonce based multi-channel broadcast entitlement management message transmitter;
at least one recipient communication transmission path responsive to said communication headend;
a multi-channel broadcast receiver responsive to said communication transmission path; and
a recipient service presentation element responsive to said nonce based multi-channel broadcast entitlement management message transmitter.

173. A numerous subscriber multi-channel broadcast program option as described in claim 172 or any other claim or clause and further comprising:
a multi-channel broadcast programming authorization processor responsive to said nonce based multi-channel broadcast entitlement management message transmitter; and
a nonce programming collective storage to which said multi-channel broadcast programming authorization processor is responsive.

174. A numerous subscriber multi-channel broadcast program option as described in claim 172 or any other claim or clause and further comprising:
a primary multi-channel broadcast service directive indicator responsive to said multi-channel broadcast program option selector;
a secondary multi-channel broadcast service directive indicator responsive to said multi-channel broadcast program option selector; and
a multi-channel broadcast programming fluctuation processor responsive to said primary multi-channel broadcast service directive indicator and said secondary multi-channel broadcast service directive indicator.

175. A numerous subscriber multi-channel broadcast program option as described in claim 174 or any other claim or clause wherein the step of multi-channel broadcast programming authorization processor comprises a secure multi-channel broadcast programming authorization processor, and wherein the step of primary multi-channel broadcast service directive indicator comprises a secure primary multi-channel broadcast service directive indicator, and wherein said secondary multi-channel broadcast service directive indicator comprises a secure secondary multi-channel broadcast service directive indicator.

176. A numerous subscriber multi-channel broadcast program option as described in claim 173 or any other claim or clause wherein the step of nonce programming collective storage comprises a minimum customer base package nonce programming collective storage.

177. A numerous subscriber multi-channel broadcast program option as described in claim 173 or any other claim or clause wherein the step of nonce programming collective storage comprises an average customer base package nonce programming collective storage.

178. A numerous subscriber multi-channel broadcast program option as described in claim 172 or any other claim or clause wherein the step of nonce based multi-channel broadcast entitlement management message transmitter comprises a high entropy entitlement management message transmitter.

179. A numerous subscriber multi-channel broadcast program option as described in claim 172 or any other claim or clause wherein the step of nonce based multi-channel broadcast entitlement management message transmitter comprises a fluctuation entitlement management message transmitter.

180. A numerous subscriber multi-channel broadcast program option as described in claim 173 or any other claim or clause wherein the step of nonce programming collective storage comprises a manufacture input nonce programming collective storage.

181. A numerous subscriber multi-channel broadcast program option as described in claim 173 or any other claim or clause wherein the step of nonce programming collective storage comprises a downloadable nonce programming collective storage.

182. A numerous subscriber multi-channel broadcast program option as described in claim 172 or any other claim or clause and further comprising a downloadable nonce programming collective storage.

183. A numerous subscriber multi-channel broadcast program option as described in claim 173 or any other claim or clause wherein the step of nonce programming collective storage comprises an alterable nonce programming collective storage.

184. A numerous subscriber multi-channel broadcast program option as described in claim 179 or any other claim or clause and further comprising:
a primary multi-channel broadcast service directive indicator responsive to said multi-channel broadcast program option selector;
a secondary multi-channel broadcast service directive indicator responsive to said multi-channel broadcast program option selector; and
a multi-channel broadcast programming fluctuation processor responsive to said primary multi-channel broadcast service directive indicator and said secondary multi-channel broadcast service directive indicator.

185. A numerous subscriber multi-channel broadcast program option as described in claim 173 or any other claim or clause wherein the step of nonce programming collective storage comprises a multi-channel broadcast receiver nonce programming collective storage.

186. A numerous subscriber multi-channel broadcast program option as described in claim 185 or any other claim or clause wherein the step of multi-channel broadcast receiver nonce programming collective storage comprises a receiver internal nonce programming collective storage.

187. A method of providing numerous subscribers multi-channel broadcast program options as described in claim 186 or any other claim or clause wherein the step of receiver internal nonce programming collective storage comprises a manufacture input receiver internal nonce programming collective storage.

188. A numerous subscriber multi-channel broadcast program option as described in claim 186 or any other claim or clause wherein the step of receiver internal nonce programming collective storage comprises an operationally responsive receiver internal nonce programming collective storage.

189. A numerous subscriber multi-channel broadcast program option as described in claim 173 or any other claim or clause wherein said nonce programming collective storage comprises a multiple nonce multi-channel broadcast program collective storage.

190. A numerous subscriber multi-channel broadcast program option as described in claim 189 or any other claim or clause wherein the step of multiple nonce multi-channel broadcast program collective storage comprises an at least about eight multiple nonce multi-channel broadcast program collective storage.

191. A numerous subscriber multi-channel broadcast program option as described in claim 189 or any other claim or clause wherein the step of multiple nonce multi-channel broadcast program collective storage comprises an at least about four multiple nonce multi-channel broadcast program collective storage.

192. A numerous subscriber multi-channel broadcast program option as described in claim 189 or any other claim or clause wherein the step of multiple nonce multi-channel broadcast program collective storage comprises an at least about two multiple nonce multi-channel broadcast program collective storage.

193. A numerous subscriber multi-channel broadcast program option as described in claim 189 or any other claim or clause wherein the step of nonce based multi-channel broadcast entitlement management message transmitter comprises a secure nonce identifying entitlement management message transmitter.

194. A numerous subscriber multi-channel broadcast program option system comprising:
a communication headend;
a multi-channel broadcast conditional access system independent secure communication transmission path responsive to said communication headend;
a multi-channel broadcast conditional access system transmitter;
a multi-channel broadcast receiver responsive to said multi-channel broadcast conditional access system independent secure communication transmission path;
a multi-channel broadcast conditional access system execution processor; and
a recipient service presentation element responsive to said multi-channel broadcast conditional access system execution processor.

195. A numerous subscriber multi-channel broadcast program option as described in claim 194 or any other claim or clause and further comprising a secure multi-channel broadcast programming authorization processor.

196. A numerous subscriber multi-channel broadcast program option as described in claim 194 or any other claim or clause further comprising a primary multi-channel broadcast service directive indicator, a secondary multi-channel broadcast service directive indicator, and a multi-channel broadcast programming fluctuation processor responsive to said primary multi-channel broadcast service directive indicator and said secondary multi-channel broadcast service directive indicator.

197. A numerous subscriber multi-channel broadcast program option as described in claim 196 or any other claim or clause wherein said primary multi-channel broadcast service directive indicator comprises a secure primary multi-channel broadcast service directive indicator and said secondary multi-channel broadcast service directive indicator comprises a secure secondary multi-channel broadcast service directive indicator.

198. A numerous subscriber multi-channel broadcast program option as described in claim 194 or any other claim or clause wherein the step of multi-channel broadcast conditional access system independent secure communication transmission path responsive to said communication headend comprises an information prior transmission path.

199. A numerous subscriber multi-channel broadcast program option as described in claim 198 or any other claim or clause wherein said information prior transmission path comprises a secure information prior transmission path.

200. A numerous subscriber multi-channel broadcast program option as described in claim 199 or any other claim or clause wherein the step of secure information prior transmission path comprises a secure socket layer protocol transmission path.

201. A numerous subscriber multi-channel broadcast program option as described in claim 194 or any other claim or clause and further comprising a conditional access system particular security processor.

202. A numerous subscriber multi-channel broadcast program option as described in claim 194 or any other claim or clause wherein the step of multi-channel broadcast conditional access system independent secure communication transmission path responsive to said communication headend comprises a one-way communication path.

203. A numerous subscriber multi-channel broadcast program option comprising:
 a communication headend;
 a substantially á la carte multi-channel broadcast program option selector;
 a multi-channel broadcast entitlement management message transmitter responsive to said substantially á la carte multi-channel broadcast program option selector;
 at least one recipient communication transmission path responsive to said communication headend;
 a multi-channel broadcast receiver responsive to said communication transmission path; and
 a recipient service presentation element responsive to said multi-channel broadcast entitlement management message transmitter.

204. A numerous subscriber multi-channel broadcast program option as described in claim 203 or any other claim or clause and further comprising a rapid authorization system that authorizes a highly variable recipient programming selection across a large subscriber base in an abridged total authorization time that is substantially less than the traditional time for such a subscriber base for highly variable recipient programming selections.

205. A numerous subscriber multi-channel broadcast program option as described in claim 204 or any other claim or clause wherein said rapid authorization system comprises a rapid authorization system selected from a group consisting of:
 a rapid authorization system capable of authorizing said highly variable recipient programming selection at an average rate faster than at least about eight thousand customers per second;
 a rapid authorization system capable of authorizing said highly variable recipient programming selection at an average rate faster than at least about ten thousand customers per second;
 a rapid authorization system capable of authorizing said highly variable recipient programming selection at an average rate faster than at least about fifteen thousand customers per second; and
 a rapid authorization system capable of authorizing said highly variable recipient programming selection at an average rate faster than at least about twenty thousand customers per second.

206. A numerous subscriber multi-channel broadcast program option as described in claim 204 or any other claim or clause wherein said rapid authorization system comprises a rapid authorization system selected from a group consisting of:
 an average less than about ten seconds per hundred thousand customers rapid authorization system;
 an average less than about seven seconds per hundred thousand customers rapid authorization system; and
 an average less than about five seconds per hundred thousand customers rapid authorization system.

207. A numerous subscriber multi-channel broadcast program option as described in claims 203 or any other claim or clause wherein said multi-channel broadcast entitlement management message transmitter comprises a less than full programming information entitlement management message transmitter.

208. A numerous subscriber multi-channel broadcast program option as described in claim 203 or any other claim or clause wherein said multi-channel broadcast entitlement management message transmitter comprises a secure high entropy multi-channel broadcast entitlement management message transmitter.

209. A numerous subscriber multi-channel broadcast program option as described in claim 204 or any other claim or clause wherein said rapid authorization system comprises:
 a primary multi-channel broadcast service directive indicator responsive to said multi-channel broadcast program option selector;
 a secondary multi-channel broadcast service directive indicator responsive to said multi-channel broadcast program option selector; and
 a multi-channel broadcast programming fluctuation processor responsive to said primary multi-channel broadcast service directive indicator and said secondary multi-channel broadcast service directive indicator.

210. A numerous subscriber multi-channel broadcast program option as described in claim 209 or any other claim or clause wherein said primary multi-channel broadcast service directive indicator comprises a communication headend primary multi-channel broadcast service directive indicator, and wherein said secondary multi-channel broadcast service directive indicator comprises a communication headend secondary multi-channel broadcast service directive indicator.

211. A numerous subscriber multi-channel broadcast program option as described in claim 209 or any other claim or clause wherein said multi-channel broadcast programming fluctuation processor comprises a multi-channel broadcast receiver processor.

212. A numerous subscriber multi-channel broadcast program option as described in claim 203 or any other claim or clause and further comprising a nonce programming collective storage, and wherein said multi-channel broadcast entitlement management message transmitter comprises nonce based multi-channel broadcast entitlement management message transmitter.

213. A numerous subscriber multi-channel broadcast program option as described in claim 203 or any other claim or clause wherein said multi-channel broadcast entitlement management message transmitter comprises a fluctuation entitlement management message transmitter.

What is claimed is:

1. A method of providing numerous subscribers multi-channel broadcast program options comprising the steps of:
   establishing a service transmission capability;
   establishing a service receipt capability;
   indicating a base subscription channel package;
   indicating a subscriber channel fluctuation entitlement management message that contains less than an individual subscriber's total individual channel authorization information;
   fluctuating said base subscription channel package by said subscriber channel fluctuation entitlement management message at said service receipt capability to create a multi-channel broadcast service subscriber composite;
   authorizing total service based on said multi-channel broadcast service subscriber composite; and
   presenting said service to a subscriber.

2. A method of providing numerous subscribers multi-channel broadcast program options as described in claim 1 wherein said step of fluctuating said base subscription channel package by said subscriber channel fluctuation entitlement management message to create a multi-channel broadcast service subscriber composite comprises the step of operating on said base subscription channel package by said subscriber channel fluctuation entitlement management message.

3. A method of providing numerous subscribers multi-channel broadcast program options as described in claim 1 wherein said step of fluctuating said base subscription channel package by said subscriber channel fluctuation entitlement management message to create a multi-channel broadcast service subscriber composite comprises the step of creating an accretion programming service composite.

4. A method of providing numerous subscribers multi-channel broadcast program options as described in claim 1 wherein said step of fluctuating said base subscription channel package by said subscriber channel fluctuation entitlement management message to create a multi-channel broadcast service subscriber composite comprises the step of creating a removal programming service composite.

5. A method of providing numerous subscribers multi-channel broadcast program options as described in claim 1 and further comprising said step of indicating at least one tertiary service directive, and wherein said step of fluctuating said base subscription channel package by said subscriber channel fluctuation entitlement management message to create a multi-channel broadcast service subscriber composite comprises the step of fluctuating said base subscription channel package by said tertiary service directive in addition to said subscriber channel fluctuation entitlement management message.

6. A method of providing numerous subscribers multi-channel broadcast program options as described in claim 1 and further comprising said step of establishing a multitude of fluctuation optimized package options.

7. A method of providing numerous subscribers multi-channel broadcast program options as described in claim 6 wherein said step of establishing a multitude of fluctuation optimized package options comprises the step of establishing at least one a la carte optimized package option.

8. A method of providing numerous subscribers multi-channel broadcast program options as described in claim 1 and further comprising said step of utilizing a close package in creating said service composite.

9. A method of providing numerous subscribers multi-channel broadcast program options as described in claim 8 and further comprising the step of determining a close package at a communication headend.

10. A method of providing numerous subscribers multi-channel broadcast program options as described in claim 9 wherein said step of fluctuating said base subscription channel package by said subscriber channel fluctuation entitlement management message to create a multi-channel broadcast service subscriber composite comprises the step of executing programmed functions at a said receipt capability.

11. A method of providing numerous subscribers multi-channel broadcast program options as described in claim 1 and further comprising the step of ubiquitously offering a large communication capacity of programming options to recipients.

12. A method of providing numerous subscribers multi-channel broadcast program options as described in claim 11 wherein said step of ubiquitously offering a large communication capacity of programming options to recipients comprises the step of offering alternative programming options selected from a group consisting of:
   offering at least about ten different alternative programming options to recipients,
   offering at least about fifteen different alternative programming options to recipients,
   offering at least about twenty different alternative programming options to recipients,
   offering at least about thirty different alternative programming options to recipients,
   offering at least about fifty different alternative programming options to recipients, and
   offering at least about one hundred different alternative programming options to recipients.

13. A method of providing numerous subscribers multi-channel broadcast program options as described in claim 1 wherein said step of authorizing total service based on said multi-channel broadcast service subscriber composite comprises the step of transmitting a fluctuation entitlement management message.

14. A method of providing numerous subscribers multi-channel broadcast program options as described in claim 1 and further comprising the steps of:
   presenting a large communication capacity of programming options to recipients; and
   prompting recipient selection from said large communication capacity of programming options.

15. A method of providing a subscriber multi-channel broadcast program options comprising the steps of:
   establishing a multi-channel broadcast service transmission capability;
   establishing a multi-channel broadcast service receipt capability;
   storing at least one nonce multi-channel broadcast program collective at said multi-channel broadcast service receipt capability;
   securely transmitting a nonce based multi-channel broadcast entitlement management message that contains less than an individual subscriber's total individual channel authorization information to said multi-channel broadcast service receipt capability to transform service indications for an individual subscriber through fluctuation of said nonce multi-channel broadcast program collective at said multi-channel broadcast service receipt capability to create a multi-channel broadcast service subscriber composite;
   authorizing a total recipient programming selection for said individual subscriber at said multi-channel broadcast service receipt capability based on said multi-channel broadcast service subscriber composite; and presenting said recipient programming selection as an authorized multi-channel broadcast service to said subscriber.

16. A method of providing numerous subscribers multi-channel broadcast program options as described in claim 15 wherein said step of securely transmitting a nonce based multi-channel broadcast entitlement management message to said multi-channel broadcast service receipt capability comprises the step of securely transmitting a fluctuation entitlement management message to said multi-channel broadcast service receipt capability.

17. A method of providing numerous subscribers multi-channel broadcast program options as described in claim 15 wherein said step of storing at least one nonce multi-channel broadcast program collective at said multi-channel broadcast service receipt capability comprises the step of storing at least one alterable nonce multi-channel broadcast program collective at said multi-channel broadcast service receipt capability.

18. A method of providing numerous subscribers multi-channel broadcast program options as described in claim 15 wherein said step of storing at least one nonce multi-channel broadcast program collective at said multi-channel broadcast service receipt capability comprises the step of storing a plurality of nonce multi-channel broadcast program collectives at said multi-channel broadcast service receipt capability.

19. A method of providing numerous subscribers multi-channel broadcast program options as described in claim 18 wherein said step of securely transmitting a nonce based multi-channel broadcast entitlement management message to said multi-channel broadcast service receipt capability comprises the step of securely transmitting a nonce identifying entitlement management message to said multi-channel broadcast service receipt capability.

20. A numerous subscriber multi-channel broadcast program option system comprising:
a communication headend;
a multi-channel broadcast program option selector;
a base subscription channel package indicator that contains less than an individual subscriber's total individual channel authorization information and is responsive to said multi-channel broadcast program option selector;
a subscriber channel fluctuation entitlement management message responsive to said multi-channel broadcast program option selector;
a multi-channel broadcast entitlement management message transmitter;
at least one communication transmission path responsive to said communication headend;
a multi-channel broadcast receiver responsive to said communication transmission path;
a multi-channel broadcast programming fluctuation processor at an individual subscriber service receipt capability that is responsive to said subscription channel package indicator and said secondary subscriber channel fluctuation entitlement management message and which authorizes a total multi-channel broadcast service composite by transforming the service indications of said subscription channel package; and
a recipient service presentation element responsive to said multi-channel broadcast programming fluctuation processor.

21. A numerous subscriber multi-channel broadcast program option system as described in claim 20 wherein said multi-channel broadcast programming fluctuation processor comprises a multi-channel broadcast programming fluctuation processor programmed to operate on information from said base subscription channel package indicator by information from said subscriber channel fluctuation entitlement management message.

22. A numerous subscriber multi-channel broadcast program option system as described in claim 20 wherein said multi-channel broadcast programming fluctuation processor comprises an accretion programming service composite processor.

23. A numerous subscriber multi-channel broadcast program option system as described in claim 20 wherein said multi-channel broadcast programming fluctuation processor comprises a removal programming service composite processor.

24. A numerous subscriber multi-channel broadcast program option system as described in claim 20 and further comprising a tertiary service directive indicator, and wherein said multi-channel broadcast programming fluctuation processor is responsive to said tertiary service directive indicator.

25. A numerous subscriber multi-channel broadcast program option system as described in claim 20 wherein said multi-channel broadcast program option selector comprises a fluctuation optimized package multi-channel broadcast program option selector.

26. A numerous subscriber multi-channel broadcast program option system as described in claim 20 wherein said multi-channel broadcast entitlement management message transmitter comprises a fluctuation entitlement management message transmitter.

* * * * *